(12) United States Patent
Takada

(10) Patent No.: US 9,960,392 B2
(45) Date of Patent: May 1, 2018

(54) ELECTRICAL STORAGE DEVICE TERMINAL FILM, AND ELECTRICAL STORAGE DEVICE

(71) Applicant: TOPPAN PRINTING CO., LTD., Tokyo (JP)

(72) Inventor: Takehisa Takada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 142 days.

(21) Appl. No.: 15/218,651

(22) Filed: Jul. 25, 2016

(65) Prior Publication Data
US 2016/0336553 A1 Nov. 17, 2016

Related U.S. Application Data

(63) Continuation of application No. PCT/JP2015/052042, filed on Jan. 26, 2015.

(30) Foreign Application Priority Data

Jan. 29, 2014 (JP) .................................. 2014-014573
Jan. 29, 2014 (JP) .................................. 2014-014574

(51) Int. Cl.
| | |
|---|---|
| *H01M 2/08* | (2006.01) |
| *B32B 7/02* | (2006.01) |
| *H01G 11/78* | (2013.01) |
| *H01M 2/06* | (2006.01) |
| *H01M 2/30* | (2006.01) |
| *H01G 11/74* | (2013.01) |
| *B32B 27/08* | (2006.01) |

(Continued)

(52) U.S. Cl.
CPC .................. *H01M 2/08* (2013.01); *B32B 7/02* (2013.01); *B32B 27/08* (2013.01); *B32B 27/20* (2013.01); *H01G 11/74* (2013.01); *H01G 11/78* (2013.01); *H01M 2/06* (2013.01); *H01M 2/30* (2013.01); *B32B 2264/102* (2013.01); *B32B 2307/304* (2013.01); *B32B 2307/702* (2013.01); *B32B 2457/00* (2013.01); *B32B 2457/10* (2013.01); *H01M 10/0525* (2013.01); *H01M 2220/30* (2013.01); *Y02E 60/13* (2013.01)

(58) Field of Classification Search
None
See application file for complete search history.

(56) References Cited

FOREIGN PATENT DOCUMENTS

| JP | 2003-123710 A | 4/2003 |
|---|---|---|
| JP | 2007-157412 | 6/2007 |
| JP | 2008-016337 | 1/2008 |

OTHER PUBLICATIONS

Extended European Search Report issued in corresponding EP application No. 15743904.3 dated Oct. 5, 2017.

(Continued)

*Primary Examiner* — Oi K Conley
(74) *Attorney, Agent, or Firm* — Foley & Lardner LLP

(57) ABSTRACT

An electrical storage device terminal film which is arranged covering part of an outer peripheral surface of a metal terminal that is electrically connected to an electrical storage device body forming an electrical storage device. The terminal film includes a first outermost layer including a first insulating layer, a second outermost layer including a second insulating layer, and an amorphous insulating filler which is added to at least one of the first and second insulating layers. The amorphous insulating filler is arranged with a part thereof being protruded from an outer surface of the insulating layer.

18 Claims, 4 Drawing Sheets

(51) Int. Cl.
*B32B 27/20* (2006.01)
*H01M 10/0525* (2010.01)

(56) References Cited

OTHER PUBLICATIONS

International Search Report issued in PCT/JP2015/052042 dated Mar. 31, 2015.

…

ELECTRICAL STORAGE DEVICE TERMINAL FILM, AND ELECTRICAL STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/052042 filed on Jan. 26, 2015, which is based upon and claims the benefit of priority of Japanese Patent Application No. 2014-014573, filed on Jan. 29, 2014, and Japanese Patent Application No. 2014-014574, filed on Jan. 29, 2014, the entire contents of them all are hereby incorporated by reference.

TECHNICAL FIELD

The present invention relates to a terminal film for an electrical storage device, and an electrical storage device, and in particular to a terminal film which is disposed between a packaging material packaging an electrical storage device body, and a metal terminal electrically connected to the electrical storage device body and extended to the outside of the packaging material, and an electrical storage device.

BACKGROUND

In recent years, there is an increasing need of downsizing mobile machines and of effective usage of electrical energy generated from natural resources. Therefore, research and development is underway to achieve lithium ion secondary batteries (as a type of electrical storage devices) that can provide higher voltage and have high energy density.

As packaging materials for such lithium ion secondary batteries as described above, metal cans have typically been used. However, metal cans are being replaced by pouched laminates, as packaging materials, which are composed of a lamination of a metal layer (e.g., aluminum foil) and a resin film. This is because such pouched laminates can cope with the needs for thinner and diversified products to which the lithium ion secondary batteries are applied, and can be manufactured at low cost.

A lithium ion secondary battery includes a battery body, a packaging material wrapping the battery body, metal terminals (tab leads) each connected to a negative or positive electrode of the battery body and extended to the outside of the packaging, and a terminal film (may often be called tab sealant) for the electrical storage device, partially covering an outer peripheral surface of each of the metal terminals.

A part of the electrical storage device terminal film is covered with a packaging material while the rest of the film is exposed from the packaging material. The electrical storage device terminal film is subjected to a thermal adhesion process for adhesion to the metal terminal.

The electrical storage device terminal film is used for insulating a metal layer composing the packaging material from the metal terminals. Therefore, the electrical storage device terminal film is desired not only to achieve adhesion between the terminal film and the packaging material and between the terminal film and the metal terminals, but also to have sufficient insulating properties after the heat sealing process (in other words, to have a thickness that can ensure sufficient insulating properties).

If the electrical storage device terminal film is transparent and the interposition of the terminal film between the packaging material and each of the metal terminals is going to be checked, it is difficult to determine the presence of the terminal film.

Further, if the electrical storage device terminal film is transparent and the position of the terminal film relative to the metal terminals is going to be checked, it is difficult to accurately determine the position of the terminal film.

As a structure for such an electrical storage device terminal film, a single layer structure or a lamination structure (e.g., see PTL 1) is known.

PTL 1 discloses an electrical storage device terminal film (film for lead wires) including a lamination of three layers each made of polypropylene graft-modified by unsaturated carboxylic acid, or polyethylene graft-modified by unsaturated carboxylic acid.

Known methods of fabricating the above-mentioned terminal film for electrical storage device include, for example, extrusion, such as inflation molding, using a round die, or die pressing using a T-die, and the like. The above-mentioned terminal film for electrical storage device is fabricated using a film-extrusion fabrication apparatus having a die, such as a round die or a T-die.

An electrical storage device terminal film fabricated by means of such an apparatus (specifically, a film-extrusion fabrication apparatus or the like) is taken up by a take-up roller configuring the apparatus, conveyed and stored.

When using (processing) the electrical storage device terminal film taken up by the roller, one end of the terminal film in a roll is drawn out.

PTL 1 also discloses that the electrical storage device terminal film (film for lead wires) is colored using a pigment or a dye to accurately check whether the terminal film is interposed between the packaging material and the metal terminals.

PTL 1 also discloses that pigments for coloring the electrical storage device terminal film include extender pigments as inorganic pigments, such as calcium carbonate, silicic anhydride, alumina and cobalt blue, white pigments, such as titanium dioxide and zinc oxide, and black pigments, such as iron black and black lead. PTL 1 further discloses use of insoluble azo pigments as organic pigments, or azo pigments such as azo lake pigments, phthalocyanine pigments such as copper phthalocyanines and metal-free phthalocyanine lakes, anthraquinone pigments, condensed polycyclic pigments such as thioindigo pigments, as well as nitroso pigments, daylight fluorescent pigments, and the like.

CITATION LIST

Patent Literature

PTL 1: JP-A-2003-123710

SUMMARY OF THE INVENTION

Technical Problem

However, when a fabricated electrical storage device terminal film is taken up, the contact area where both surfaces (pair of outer surfaces) of the terminal film are in contact with each other is increased because both of the surfaces are smooth. Accordingly, adhesion between the surfaces of the terminal film is increased.

Therefore, there is a problem that, when the electrical storage device terminal film taken up by a roller is processed with one end of the terminal film being drawn out, a blocking phenomenon is caused between the surfaces of the terminal film in contact with each other.

In light of the foregoing problem, the present invention has an object of providing an electrical storage device terminal film which can decrease or even minimize the occurrence of a blocking phenomenon when one end of a roll of the terminal film taken up by a roller is drawn out, and providing an electrical storage device.

Further, when an electrical storage device terminal film is colored using the pigments disclosed in PTL 1, it is difficult to achieve the coloring with a deeper hue.

Therefore, for example, when a metal terminal has a small width (e.g., 3 mm or less) and the electrical storage device terminal film also has a small width (e.g., 5 mm or less), it is difficult to accurately find the mounting position of the terminal film.

In this regard, the present invention has an object of providing an electrical storage device terminal film, which can improve the accuracy of checking the terminal film by adding carbon black, lead black or the like as an electrically conductive pigment to an insulating layer configuring an intermediate layer arranged between two outermost layers of the terminal film to color the intermediate layer with a deeper hue, and can ensure sufficient insulating properties between a metal terminal with which the terminal film is thermally adhered and the intermediate layer, and providing an electrical storage device.

Solution to Problem

To attempt to solve the problems set forth above, an electrical storage device terminal film related to a first aspect of the present invention, which is arranged covering part of an outer peripheral surface of a metal terminal electrically connected to an electrical storage device body configuring an electrical storage device, includes: a first outermost layer including a first insulating layer; a second outermost layer including a second insulating layer; and an amorphous insulating filler added to at least one of the first insulating layer and the second insulating layer. In the terminal film, part of the amorphous insulating filler is arranged being protruded from an outer surface of the insulating layer to which the amorphous insulating filler has been added.

According to the electrical storage device terminal film related to the first aspect of the present invention, the amorphous insulating filler added to at least one of the first and second insulating layers is arranged with a part of the filler being protruded from an outer surface of the insulating layer. Thus, when the electrical storage device terminal films are brought into contact with each other, a contact area between the films can be reduced (reduction of contact area), improving smoothness between the films in contact with each other (i.e. improving anti-blocking properties).

Thus, for example, when an end of the electrical storage device terminal film taken up in a roll is drawn out, the occurrence of a blocking phenomenon can be minimized.

Further, since the insulating layer contains the insulating filler, the insulating filler can serve as a spacer when the electrical storage device terminal film is thermally adhered to a metal terminal. Thus, the insulating layer is prevented from becoming thinner, thereby improving the insulation properties of the outermost layer which is formed of the insulating layer containing the amorphous insulating filler.

In the electrical storage device terminal film related to the first aspect of the present invention, the amorphous insulating filler may have an average particle size in a range of 0.1 to 20 μm.

When the amorphous insulating filler has an average particle size smaller than 0.1 μm, the size of the amorphous insulating filler protruded from the external surface of the insulating layer becomes excessively small. This makes it difficult to obtain sufficient anti-blocking effect.

On the other hand, when the amorphous insulating filler has an average particle size larger than 20 μm, the excessively large amorphous insulating filler reduces the contact area between the metal terminal (i.e. tab lead) and a packaging material, and deteriorates adhesiveness.

Accordingly, the amorphous insulating filler whose average particle size is set to within a range of 0.1 to 20 μm can achieve sufficient anti-blocking effect, and at the same time, can improve adhesiveness of the electrical storage device terminal film.

In the electrical storage device terminal film related to the first aspect of the present invention, the insulating layer to which the amorphous insulating filler has been added may have a thickness 2 to 30 times the average particle size of the amorphous insulating filler.

If the thickness of the insulating layer to which the amorphous insulating filler has been added is smaller than 2 times the average particle size of the amorphous insulating filler, the ratio of the amorphous insulating filler protruding from the outer surface of the insulating layer will be excessively high. This leads to deteriorating intimate contact between the metal terminal (i.e. tab lead) and the electrical storage device terminal film, or deteriorating intimate contact between the packaging material and the electrical storage device terminal film.

If the thickness of the insulating layer to which the amorphous insulating filler has been added is larger than 30 times the average particle size of the amorphous insulating filler, the ratio of the amorphous insulating filler protruding from the outer surface of the insulating layer will be extremely low. This makes it difficult to obtain sufficient anti-blocking effect.

Thus, when the thickness of the insulating layer to which the amorphous insulating filler has been added is 2 to 30 times the average particle size of the amorphous insulating filler, sufficient anti-blocking effect can be obtained, and at the same time, adhesiveness of the electrical storage device terminal film can be improved.

In the electrical storage device terminal film related to the first aspect of the present invention, an additive amount of the amorphous insulating filler may be in a range of 0.1 to 20 wt %.

If the additive amount of the amorphous insulating filler is less than 0.1%, the amorphous insulating fillers protruding from the outer surface of the insulating layer will be excessively decreased, insufficiently achieving the effect of reducing the contact area between the electrical storage device terminal films.

Thus, it is difficult to improve smoothness between the electrical storage device terminal films contacting with each other (i.e. to improve anti-blocking effect).

On the other hand, if the additive amount of the amorphous insulating filler is more than 20%, the amorphous insulating fillers protruding from the outer surface of the insulating layer will be excessively increased, reducing the contact area between the electrical storage device terminal films (specifically, between the insulating layers).

Thus, after thermal adhesion of the electrical storage device terminal film to the metal terminal or to the packaging material, it is difficult to ensure sufficient adhesion between the electrical storage device terminal film and the metal terminal or the packaging material.

Accordingly, when the additive amount of the amorphous insulating filler to be contained in the insulating layer is in a range of 0.1 to 20%, smoothness between the electrical storage device terminal films contacting with each other can be improved (i.e. anti-blocking effect can be improved), without deteriorating adhesion between the electrical storage device terminal film and the metal terminal or the packaging material.

In the electrical storage device terminal film related to the first aspect of the present invention, the amorphous insulating filler may be added to only one of the first insulating layer and the second insulating layer.

When the amorphous insulating filler is added to only one of the first and second insulating layers, smoothness can also be improved between the electrical storage device terminal films contacting with each other (i.e. anti-blocking effect can be improved).

Accordingly, for example, when one end of the electrical storage device terminal film taken up in a roll is drawn out, the occurrence of a blocking phenomenon can be minimized.

Since the insulating filler serves as a spacer, the thickness of the insulating layer can be prevented from becoming thinner, thereby improving the insulating properties of the outermost layer which is formed of the insulating layer containing the amorphous insulating filler.

The electrical storage device terminal film related to the first aspect of the present invention may include a third insulating layer arranged between the first outermost layer and the second outermost layer, and an intermediate layer containing a pigment added to the third insulating layer.

Since the device includes the third insulating layer arranged between the first and second outermost layers, and the intermediate layer containing a pigment added to the third insulating layer, the intermediate layer can be colored by the pigment.

Accordingly, visibility of the electrical storage device terminal film is improved, which enables accurate determination on whether the electrical storage device terminal film is attached to the metal terminal, or on the position of attaching the electrical storage device terminal film relative to the metal terminal.

In the electrical storage device terminal film related to the first aspect of the present invention, fourth insulating layers may be arranged between the intermediate layer and the first outermost layer and between the intermediate layer and the second outermost layer.

When, for example, electrically conductive carbon black is used as the pigment, the arrangement of the forth insulating layer between the intermediate layer and the first outermost layer and between the intermediate layer and the second outermost layer can contribute to further improving insulation properties between the intermediate layer and the metal layer forming the packaging material, and insulation properties between the intermediate layer and the metal terminal.

To attempt to solve the problems set forth above, an electrical storage device related to a second aspect of the present invention includes: an electrical storage device terminal film according to the first aspect; an electrical storage device body performing charging/discharging; a pair of the metal terminals each electrically connected to the electrical storage device body and partially covered with the electrical storage device terminal film; and a packaging material covering part of the electrical storage device terminal film, and the electrical storage device body.

According to the electrical storage device related to the second aspect of the present invention, the electrical storage device terminal film of the first aspect covers a part of the metal terminal to obtain sufficient anti-blocking effect and improve intimate contact between the electrical storage device terminal film and the metal terminal.

In the electrical storage device related to the second aspect of the present invention, the first outermost layer may be arranged covering part of an outer peripheral surface of the metal terminal, and the second outermost layer may be arranged being in contact with the packaging material.

By arranging one of the outermost layers so as to contact the packaging material, the intimate contact can be improved between the outermost layer and the packaging material.

To attempt to solve the problems set forth above, the inventor of the present invention conceived an idea, in the electrical storage device terminal film where three or more insulating layers are laminated, of adding an electrically conductive pigment that is carbon black or black lead (hereinafter referred to as electrically conductive pigment) to the insulating layer forming the intermediate layer which is located between the two outermost layers to thereby create a black coloration in the intermediate layer for further improvement of visibility compared to the conventional art.

As a result of thorough studies, the inventor of the present invention found the thickness of the outermost layer arranged between the intermediate layer and the metal terminal to be important. Specifically, when the electrical storage device terminal film having the intermediate layer colored by the electrically conductive pigment is arranged covering an outer peripheral surface of the metal terminal, it is necessary to ensure insulation properties between the intermediate layer, which is electrically conductive due to containing the electrically conductive pigment, and the metal terminal. To this end, it is important that the outermost layer arranged between the intermediate layer and the metal terminal does not have an excessively small thickness, after a heat-sealing process of thermally adhering the electrical storage device terminal film to the metal terminal (process of achieving thermal adhesion therebetween with the application of a predetermined pressure at a predetermined temperature).

To attempt to solve the problems set forth above, an electrical storage device terminal film related to a third aspect of the present invention, which is arranged covering part of an outer peripheral surface of a metal terminal electrically connected to an electrical storage device body configuring an electrical storage device, includes: a first outermost layer including a first insulating layer; a second outermost layer including a second insulating layer; and a third insulating layer arranged between the first outermost layer and the second outermost layer, and an intermediate layer containing an electrically conductive pigment enabling a coloration in black, the pigment being added to the third insulating layer. In the terminal film, an insulating filler is added to at least one of the first insulating layer and the second insulating layer.

According to the electrical storage device terminal film related to the third aspect of the present invention, an electrically conductive pigment that can create a black coloration is added to the third insulating layer, so that the intermediate layer can be colored with a deep hue (specifically, colored in black).

Thus, visibility of the electrical storage device terminal film is improved, thereby improving accuracy in an inspection of the electrical storage device terminal film (e.g., an inspection as to whether the electrical storage device terminal film is attached to the metal terminal, an inspection as to the position of the electrical storage device terminal film relative to the metal terminal, or the like).

Coloration of the intermediate layer with a deep hue is particularly effective when the width of the electrical storage device terminal film is small.

An insulating filler is added to at least one of the first and second insulating layers. Accordingly, after a heat-sealing process (process of achieving thermal adhesion between the metal terminal and an outermost layer by applying a predetermined pressure at a predetermined temperature), the insulating filler can serve as a spacer for ensuring the thickness of the outermost layer to which the insulating filler has been added.

By arranging the electrical storage device terminal film so as to bring the outermost layer, to which the insulating filler has been added, in contact with the metal terminal, insulation properties are well ensured between the intermediate layer having electrical conductivity due to containing the electrically conductive pigment, and the metal terminal.

When the two outermost layers contain the insulating filler, the outermost layer arranged between the metal layer forming the packaging material and the intermediate layer can improve insulation properties between the metal layer and the intermediate layer.

Specifically, according to the electrical storage device terminal film related to the third aspect of the present invention, the intermediate layer is colored with a deep hue (black color) by adding an electrically conductive pigment to the insulating layer which forms the intermediate layer arranged between the two outermost layers. Thus, accuracy is improved in an inspection of the electrical storage device terminal film, and insulation properties are sufficiently ensured between the metal terminal thermally adhered with the electrical storage device terminal film and the intermediate layer.

In the electrical storage device terminal film related to the third aspect of the present invention, an insulating filler may be added to only one of the first insulating layer and the second insulating layer.

If the insulating filler is added to only one of the first and second insulating layers, the accuracy can be improved in an inspection of the electrical storage device terminal film, and sufficient insulation properties can be ensured between the metal terminal thermally adhered with the electrical storage device terminal film, and the intermediate layer.

In the electrical storage device terminal film related to the third aspect of the present invention, a content of the electrically conductive pigment in the intermediate layer may be in a range of 0.01 wt % to 3.00 wt %, inclusive.

If the content (concentration) of the electrically conductive pigment in the intermediate layer is less than 0.01 wt %, there will be difficulty in coloring the intermediate layer with a deep hue. If the content of the electrically conductive pigment added to the intermediate layer is more than 3.00 wt %, the intermediate layer will have excessively high electrical conductivity. Accordingly, it is difficult to sufficiently ensure electrical insulation properties between the intermediate layer and the metal terminal.

Thus, by adding the electrically conductive pigment to the third insulating layer by a content (concentration) of 0.01 wt % to 3.00 wt %, inclusive, visibility of the electrical storage device terminal film is improved, and electrical insulation properties of the film are sufficiently ensured.

In the electrical storage device terminal film related to the third aspect of the present invention, the insulating filler may have an average particle size that is $\frac{1}{30}$ to $\frac{1}{2}$ the thickness of an insulating layer to which the insulating filler has been added.

When the insulating filler has an average particle size which is $\frac{1}{30}$ to $\frac{1}{2}$ the thickness of the insulating layer to which the insulating filler has been added, the insulating filler can well serve as a spacer, without deteriorating thermal adhesion of the outermost layer (including the insulating filler) to the metal terminal.

In the electrical storage device terminal film related to the third aspect of the present invention, a content (concentration) of the insulating filler may be in a range of 0.1 wt % to 20 wt %, inclusive.

If content of the insulating filler added to the insulating layer is excessively small, i.e. less than 0.1 wt %, the insulating filler hardly serves as a spacer. Therefore, the thickness of the outermost layer including the insulating filler will be excessively small after the thermal adhesion process.

As a result, it would be difficult for the outermost layer arranged between the intermediate layer and the metal terminal to insulate therebetween.

If the content of the insulating filler added to the insulating layer is more than 20 wt %, the ratio of the insulating layer is small. Therefore, thermal adhesion (i.e. intimate contact) is deteriorated between the outermost layer including the insulating filler and the metal terminal.

Thus, when the content of the insulating filler added to the insulating layer is in a range of 0.1 wt % to 20 wt %, inclusive, the intermediate layer having electrical conductivity can be insulated from the metal terminal, without deteriorating thermal adhesion of the outermost layer, to which the insulating filler has been added, with the metal terminal.

In the electrical storage device terminal film related to the third aspect of the present invention, the insulating filler may have a spherical shape.

When the insulating filler has a spherical shape, the function of the insulating filler as a spacer is improved, compared to the case where an amorphous filler is used as an insulating filler. Thus, the thickness of the outermost layer including the insulating filler is increased after the heat-sealing process.

In the electrical storage device terminal film related to the third aspect of the present invention, fourth insulating layers may be arranged between the intermediate layer and the first outermost layer and between the intermediate layer and the second outermost layer.

Arrangement of the fourth insulating layers between the intermediate layer and the first outermost layer and between the intermediate layer and the second outermost layer can contribute to improving insulation properties between the intermediate layer and the metal layer forming the packaging material, and insulation properties between the intermediate layer and the metal terminal.

To attempt to solve the problems set forth above, an electrical storage device related to a fourth aspect of the present invention includes: an electrical storage device terminal film according to the third aspect; an electrical storage device body performing charging/discharging; a pair of the metal terminals each electrically connected to the electrical storage device body and partially covered with the electrical storage device terminal film; and a packaging material covering part of the electrical storage device terminal film, and the electrical storage device body.

According to the electrical storage device related to the fourth aspect of the present invention, the electrical storage device terminal film of the third aspect covers part of the metal terminal to improve accuracy in inspection of the electrical storage device terminal film, and sufficiently ensure insulation properties between the metal terminal thermally adhered with the electrical storage device terminal film, and the intermediate layer.

In the electrical storage device related to the fourth aspect of the present invention: the first outermost layer may be arranged covering part of an outer peripheral surface of the metal terminal, and the second outermost layer may be arranged being in contact with the packaging material; and the first outermost layer may contain the insulating filler.

When one of the outermost layers arranged covering part of the outer peripheral surface of the metal layer contains an insulating filler, sufficient insulation properties can be ensured between the metal terminal thermally adhered with the electrical storage device terminal film, and the intermediate layer.

Advantageous Effects of the Invention

According to the electrical storage device terminal film related to the first aspect and the electrical storage device related to the second aspect of the present invention, the occurrence of a blocking phenomenon can be minimized when an end of the electrical storage device terminal film taken up in a roll is drawn out.

According to the electrical storage device terminal film related to the third aspect of the present invention, accuracy is improved in inspection of the electrical storage device terminal film, and electrical insulation properties are sufficiently ensured between the intermediate layer containing the electrically conductive pigment enabling coloration in black, and the metal terminal.

DESCRIPTION OF REPRESENTATIVE EMBODIMENTS

Figure 1:
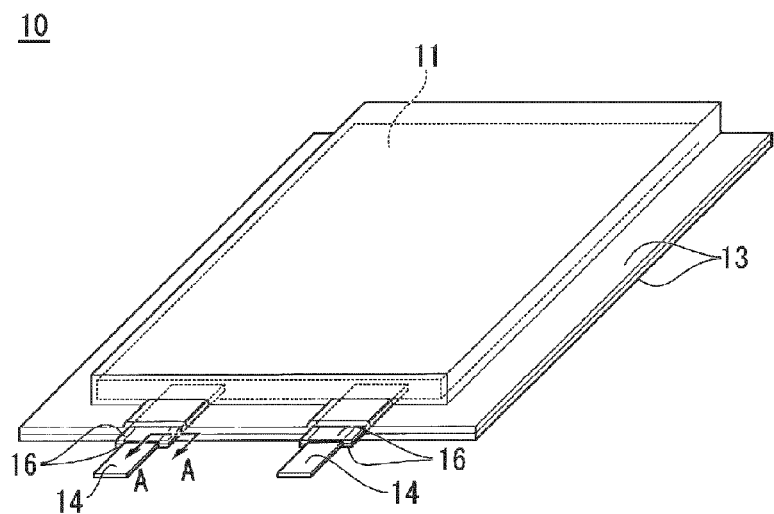
FIG. 1 is a perspective view illustrating a schematic configuration of an electrical storage device, according to a first embodiment of the present invention.

With reference to the drawings, hereinafter will be specifically described some embodiments to which the present invention is applied. It should be noted that the drawings referred in the following description are for explaining configurations of the embodiments of the present invention. Therefore, the size, thickness, dimension and the like of the components shown in the drawings may be different from the dimensional relationship of an actual electrical storage device terminal film, and an electrical storage device.

First Embodiment

FIG. 1 is a perspective view illustrating a schematic configuration of an electrical storage device according to a first embodiment of the present invention. FIG. 1 shows a lithium ion secondary battery as an example of an electrical storage device 10. The following description is provided by way of this example.

It should be noted that the lithium ion secondary battery having a configuration shown in FIG. 1 may be called a battery pack or a battery cell.

Referring to FIG. 1, the electrical storage device 10 of the present embodiment is a lithium ion secondary battery, and includes an electrical storage device body 11, a packaging material 13, a pair of metal terminals 14 (which may be called tab leads), and electrical storage device terminal films 16 (which may be called tab sealants).

The electrical storage device body 11 is a battery body performing charge/discharge. The packaging material 13 covers surfaces of the electrical storage device body 11, while being arranged so as to be partially in contact with the electrical storage device terminal films 16.

Figure 2:
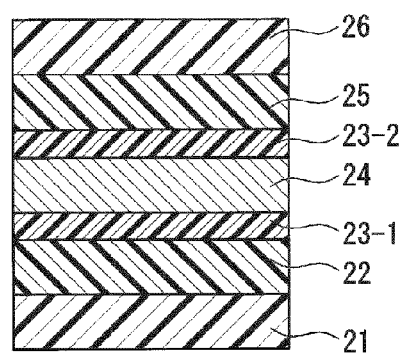
FIG. 2 is a cross-sectional view illustrating an example of a cross section of a packaging material shown in FIG. 1.

FIG. 2 is a cross-sectional view illustrating an example of a cross section of a packaging material shown in FIG. 1. In FIG. 2, the components which are identical with those of the structure shown in FIG. 1 are given the same reference signs.

Referring now to FIG. 2, an example of a configuration of the packaging materials 13 will be described.

The packaging material 13 has a seven-layer structure including an inner layer 21, an inner layer-side adhesive layer 22, an anti-corrosion treatment layer 23-1, a barrier layer 24 as a metal layer, an anti-corrosion treatment layer 23-2, an outer layer-side adhesive layer 25, and an outer layer 26, which are laminated in this order, from an inner side contacting the electrical storage device body 11.

Base materials that can be used for the inner layer 21 can include, for example, polyolefin resins, or acid-modified polyolefin resins obtained by graft-modifying polyolefin resins with maleic anhydrides or the like.

The polyolefin resins that can be used include, for example: low-, middle- and high-density polyethylenes; ethylene-α olefin copolymers; homo-, block- or random-polypropylenes; and propylene-α olefin copolymers. These polyolefin resins may be used singly or in combination of two or more.

Depending on the needed functions, the inner layer 21 may be formed using a single-layer film or a multilayer film in which a plurality of layers are laminated. Specifically, for example, a multilayer film interposed by a resin, such as ethylene-cyclic olefin copolymer or polymethyl pentene, may be used to impart moisture resistance.

The inner layer 21 may contain, for example, various additives (e.g., flame retarders, slip agents, anti-blocking agents, antioxidants, light stabilizers, tackifiers, and the like).

The inner layer 21 is preferably set in a range, for example, of 10 to 150 μm, and more preferably in a range of 30 to 80 μm.

If the thickness of the inner layer 21 is smaller than 10 μm, there is a concern that heat seal adhesion between the packaging materials 13, or adhesion between the packaging material 13 and the electrical storage device terminal film 16 is deteriorated. The inner layer 21 having a thickness larger than 150 μm creates a factor of increasing cost of the packaging material 13 and thus is not preferable.

As the inner layer-side adhesive layer 22, a known adhesive can be appropriately selected and used, such as a generally used adhesive for dry lamination, an acid-modified thermally adhesive resin, or the like.

As shown in FIG. 2, it is preferable that the anti-corrosion treatment layers 23-1 and 23-2 are formed on both surfaces of the barrier layer 24 from the viewpoint of performance. However, taking account of cost, the anti-corrosion treatment layer 23-1 alone may be arranged on the inner layer-side adhesive layer 22 side surface of the barrier layer 24.

The barrier layer 24 is a metal layer having electrical conductivity. Materials for the barrier layer 24 that can be exemplified include, for example, aluminum, stainless steel and the like. However, from the viewpoint of cost or weight (density), aluminum is preferable.

Materials that can be used for the outer layer-side adhesive layer 25 include, for example, generally used urethane-based adhesives containing polyester polyol, polyether polyol, acrylic polyol or the like as a main resin.

Layers that can be used for the outer layer 26 include, for example, single-layer films or multi-layer films such as of nylon, polyethylene terephthalate (PET) or the like.

Similar to the inner layer 21, the outer layer 26 may contain various additives (e.g. flame retarders, slip agents, anti-blocking agents, antioxidants, light stabilizers, tackifiers, and the like), for example.

Further, the outer layer 26 may include, as a measure against fluid leakage, a protective layer formed, for example, by laminating a resin which is insoluble in an electrolytic solution, or coating a resin component which is insoluble in an electrolytic solution.

Figure 3:
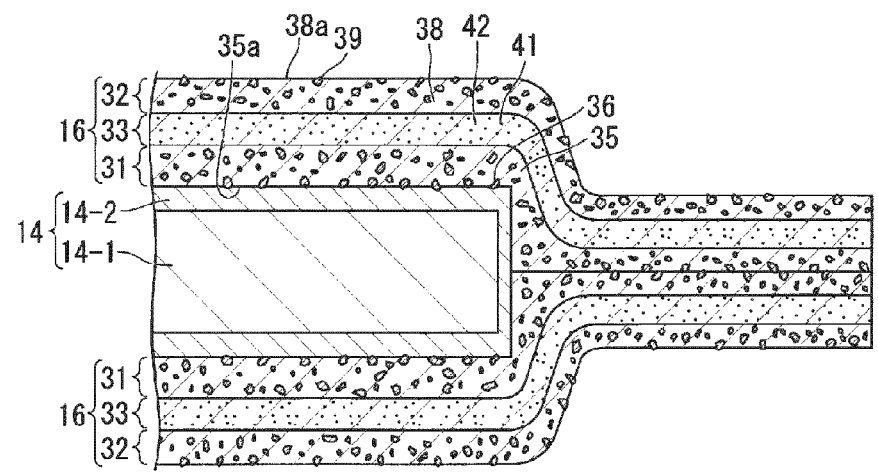
FIG. 3 is a cross-sectional view taken along the line A-A of FIG. 1, illustrating an electrical storage device terminal film and a metal terminal.

FIG. 3 is a cross-sectional view taken along the line A-A of FIG. 1, illustrating the electrical storage device terminal film and the metal terminals. In FIG. 3, the components identical with those of the structure shown in FIG. 1 are given the same reference signs.

Referring to FIGS. 1 and 3, in a pair (two in FIG. 1) of metal terminals 14, each metal terminal includes a metal terminal body 14-1 and an anti-corrosion layer 14-2.

Of the pair of metal terminal bodies 14-1, one is electrically connected to a positive electrode of the electrical storage device body 11, and the other is electrically connected to a negative electrode of the electrical storage device body 11.

The pair of metal terminal bodies 14-1 are extended in a direction away from the electrical storage device body 11, while being partially exposed from the packaging material 13. The pair of metal terminal bodies 14-1 may each be in a plate-like shape, for example.

As materials for the metal terminal bodies 14-1, metals can be used. The material serving as the metal terminal bodies 14-1 is preferably determined taking account, for example, of the structure of the electrical storage device body 11, materials of the components of the device body 11, and the like.

For example, when the electrical storage device 10 is a lithium ion secondary battery, aluminum is used as a positive electrode current collector while copper is used as a negative electrode current collector.

In this case, aluminum is preferably used as a material for the metal terminal body 14-1 connected to the positive electrode of the electrical storage device body 11. Taking account of corrosion resistance to an electrolytic solution, an aluminum material, such as IN30, having purity of 97% or more is preferably used, for example, as a material for the metal terminal body 14-1 connected to the positive electrode of the electrical storage device body 11.

Further, when the metal terminal body 14-1 is bent, a metal material which is tempered by sufficient annealing is preferably used for the purpose of adding flexibility.

As a material used for the metal terminal body 14-1 connected to the negative terminal of the electrical storage device body 11, it is preferable to use copper whose surface is provided with a nickel-plated layer, or to use nickel.

The metal terminal body 14-1 has a thickness which depends on the size or capacity of the lithium ion secondary battery. If the lithium ion secondary battery is of a small size, the thickness of the metal terminal body 14-1 is preferably 50 μm or more, for example.

If the lithium ion secondary battery is of a large size so as to be applicable such as to electrical storage and vehicle installation, the thickness of the metal terminal body 14-1 can be appropriately set to within the range of 100 to 500 μm, for example.

The anti-corrosion layer 14-2 is arranged covering a surface of the metal terminal body 14-1. Lithium ion secondary batteries include an electrolytic solution that contains corrosive components, such as $LiPF_6$.

The anti-corrosion layer 14-2 minimizes corrosion of the metal terminal body 14-1 caused by the corrosive components, such as $LiPF_6$, contained in the electrolytic solution.

Referring to FIG. 3, the electrical storage device terminal films 16 are arranged covering part of the outer peripheral surface of the metal terminal 14. The electrical storage device terminal films 16 are each configured by a first outermost layer 31 contacting the outer peripheral surface of the metal terminal 14, a second outermost layer 32 contacting the packaging material 13, and an intermediate layer 33 arranged between the first and second outermost layers 31 and 32.

The first outermost layer 31 is arranged covering one surface (first surface) of the intermediate layer 33 that contains a pigment 42. The first outermost layer 31 is configured, including a first insulating layer 35 that is an insulating resin layer, and an amorphous insulating filler 35 (insulating filler whose shape is amorphous).

The first insulating layer 35 (i.e. the first outermost layer 31) is arranged covering part of the outer peripheral surface of the metal terminal 14.

The first outermost layer 31, which is arranged covering the outer peripheral surface of the metal terminal 14 (part of the outer peripheral surface of the metal terminal) to seal the metal terminal 14 in the circumferential direction, while achieving adhesion between the electrical storage device terminal film 16 and the metal terminal 14.

Accordingly, the material configuring the first insulating layer 35 is preferably a resin having good adhesiveness, for example. Resin materials that can be used for forming the first insulating layer 35 include, for example, acid-modified polyolefin resins or the like obtained by graft-modifying polyolefin resins with maleic anhydrides or the like.

The second outermost layer 32 is arranged covering the other surface of the intermediate layer 33 (second surface that is on the opposite side of the first surface) that contains the pigment 42. The second outermost layer 32 is configured, including a second insulating layer 38 that is an insulating resin layer, and the amorphous insulating filler 36 (insulating filler whose shape is amorphous).

The second insulating layer 38 (i.e. the second outermost layer 32) is thermally adhered to the packaging material 13 (specifically, the inner layer 21 shown in FIG. 2), for contact with the packaging material 13.

The second insulating layer 38, which is thermally adhered to the packaging material 13, seals the packaging material 13, while achieving intimate contact between the electrical storage device terminal film 16 and the packaging material 13 (specifically, the inner layer 21 shown in FIG. 2).

Accordingly, from the viewpoint of achieving adhesion between the electrical storage device terminal film 16 and the packaging material 13, the material of the first insulating layer 35 is preferably a resin (e.g., a polyolefin resin) which is similar to the resin used as a base material of the inner layer 21.

The first insulating layer 35 preferably has a thickness which is 2 to 30 times the average particle size (e.g., 0.1 to 20 μm) of the amorphous insulating filler 36.

If the thickness of the first insulating layer 35, to which the amorphous insulating filler 36 is added, is smaller than 2 times the average particle size of the amorphous insulating filler 36, the amorphous insulating filler 36 will protrude, at an excessively high ratio, from an outer surface 35a of the first insulating layer 35. Therefore, the adhesion between the metal terminal 14 (e.g. tab lead) and the first insulating layer 35 is deteriorated.

If the thickness of the first insulating layer 35, to which the amorphous insulating filler 36 is added, is larger than 30 times the average particle size of the amorphous insulating filler 36, the amorphous insulating filler 36 will protrude, at a considerably low ratio, from the outer surface 35a of the first insulating layer 35. Therefore, it is difficult to obtain sufficient anti-blocking effect.

Accordingly, when the thickness of the first insulating layer 35, to which the amorphous insulating filler 36 is added, is 2 to 30 times the average particle size of the amorphous insulating filler 36, sufficient anti-blocking effect can be obtained while adhesion can be improved.

Figure 4:
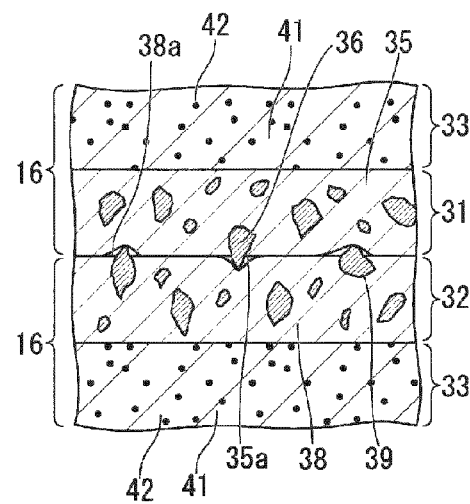
FIG. 4 is a partially enlarged schematic cross-sectional view illustrating the electrical storage device terminal film that has been taken up.

FIG. 4 is a partially enlarged schematic cross section of the electrical storage device terminal film that has been taken up. In FIG. 4, the components similar to those of the structure shown in FIG. 3 are given the same reference signs.

Referring to FIGS. 3 and 4, the amorphous insulating filler 36 is added to the first insulating layer 35. The amorphous insulating filler 36 is disposed, partially protruding from the outer surface 35a (the surface contacting the anti-corrosion layer 14-2 shown in FIG. 3) of the first insulating layer 35. Of the amorphous insulating filler 36, those parts which protrude from the outer surface 35a serve as an anti-blocking agent.

In this way, the amorphous insulating filler 36 is arranged, being partially protruded from the outer surface 35a of the first insulating layer 35. Thus, for example, when the electrical storage device terminal films 16 are brought into contact with each other as shown in FIG. 4, the outer surface 35a positioned around the amorphous insulating filler 36 protruded therefrom will no longer be in contact with an outer surface 38a of the second insulating layer 38. This can reduce a contact area between the electrical storage device terminal films 16 (specifically, a contact area between the outer surface 35a of the first insulating layer 35 and the outer surface 38a of the second insulating layer 38). As a result, smoothness can be improved (i.e. anti-blocking effect can be improved) between the electrical storage device terminal films 16 which are in contact with each other.

Accordingly, when an end of the electrical storage device terminal film 16 that has been taken up is drawn out, the occurrence of a blocking phenomenon can be minimized.

The amorphous insulating filler 36 also serves as a spacer for ensuring the thickness of the first outermost layer 31 after thermal adhesion process (after process for applying a predetermined pressure at a predetermined temperature and thermally adhering the packaging material 13 to the second outermost layer 32).

Thus, after the thermal adhesion process, the thickness of the first outermost layer 31 is prevented from becoming smaller than a predetermined thickness. Therefore, for example, if electrically conductive carbon black is used as the pigment 42 configuring the intermediate layer 33, electrically insulating properties can be sufficiently ensured between the metal terminal 14 and the intermediate layer 33.

The amorphous insulating filler 36 may be a transparent amorphous insulating filler, or may be a colored amorphous insulating filler. Specifically, fillers that can be used as the amorphous insulating filler 36 include, for example, fillers made of metal oxides (e.g., alumina, silica, and the like), and fillers made of organic materials (e.g., polycarbonate, and epoxy resins).

From the viewpoint of cost of the electrical storage device terminal film 16, the amorphous insulating filler 36 is preferably an inexpensive amorphous silica filler.

The amorphous insulating filler 36 preferably has an average particle size, for example, in the range of 0.1 to 20 μm.

If the average particle size of the amorphous insulating filler 36 is smaller than 0.1 μm, the size of the amorphous insulating filler 36 protruding from the outer surface 35a of the first insulating layer 35 will be excessively small. Accordingly, it is difficult to obtain sufficient anti-blocking effect.

On the other hand, if the average particle size of the amorphous insulating filler 36 is larger than 20 μm, the amorphous insulating filler 36 will have an excessively large size. This results in reducing a contact area of the insulating layer 35 with the metal terminal 14 (i.e. tab lead), and thus deteriorating adhesion.

Accordingly, by setting the average particle size of the amorphous insulating filler 36 to the range of 0.1 to 20 μm, sufficient anti-blocking effect can be obtained while adhesion can be improved.

The amorphous insulating filler 36 can be added to the first insulating layer 35 by an additive amount, for example, which is appropriately set within the range of 0.1 to 20 wt %.

If the additive amount of the amorphous insulating filler 36 is smaller than 0.1 wt %, the amorphous insulating filler 36 protruding from the outer surface 35a of the first insulating layer 35 will be excessively decreased. Therefore, the effect of reducing the contact area between the electrical storage device terminal films 16 will be insufficient.

Thus, it is difficult to improve smoothness between the electrical storage device terminal films 16 contacting with each other (i.e. to improve the anti-blocking effect).

On the other hand, if the additive amount of the amorphous insulating filler 36 is larger than 20 wt %, the amorphous insulating filler 36 protruding from the outer surface 35a of the first insulating layer 35 will be excessively increased. As a result, the contact area between the electrical storage device terminal films (i.e. between the insulating layers) will be considerably small.

Thus, it is difficult to sufficiently ensure adhesion between each electrical storage device terminal film 16 and the metal terminal 14 after being thermally adhered (see FIG. 1).

For this reason, the amount of the amorphous insulating filler 36 added to the first insulating layer 35 is ensured to be in the range of 0.1 to 20 wt %. Thus, smoothness between the electrical storage device terminal films 16 contacting with each other can be improved (i.e. anti-blocking effect is improved) without deteriorating adhesion between each electrical storage device terminal film 16 and the metal terminal 14 or the packaging material 13.

Referring to FIGS. 3 and 4, the second outermost layer 32 is arranged covering the second surface of the intermediate layer 33 containing the pigment 42. The second outermost layer 32 is configured to include the second insulating layer 38 as an insulating resin layer and the amorphous insulating filler 39 (insulating filler whose shape is amorphous).

The second insulating layer 38 (i.e. the second outermost layer 32) is thermally adhered to the packaging material 13 (specifically, the inner layer 21 shown in FIG. 2) and brought into contact therewith.

The second insulating layer 38 is thermally adhered to the packaging material 13 to thereby seal the packaging material 13, while achieving intimate contact between the electrical storage device terminal film 16 and the packaging material 13 (specifically, the inner layer 21 shown in FIG. 2).

Accordingly, from the viewpoint of achieving adhesion between the electrical storage device terminal film 16 and the packaging material 13, the material of the second insulating layer 38 is preferably a resin (e.g., a polyolefin resin) which is similar to the resin used as a base material of the inner layer 21.

The amorphous insulating filler 39 is added to the second insulating layer 38. The amorphous insulating filler 39 is arranged being partially protruded from the outer surface 38a of the second insulating layer 38. Of the amorphous insulating filler 39, those parts which protrude from the outer surface 38a serve as an anti-blocking agent.

Thus, the amorphous insulating filler 39 arranged being partially protruded from the outer surface 38a of the second insulating layer 38 can exert an effect similar to that exerted by the amorphous insulating filler 36 arranged being partially protruded from the outer surface 35a of the first insulating layer 35 (specifically, the effect of improving smoothness between the electrical storage device terminal films 16 contacting with each other (i.e. improving anti-blocking effect)).

In this way, the occurrence of a blocking phenomenon can be minimized when drawing out an end of the electrical storage device terminal film 16 that has been taken up.

The amorphous insulating filler 39 also serves as a spacer for ensuring the thickness of the second outermost layer 32 after thermal adhesion process (after process of applying a predetermined pressure at a predetermined temperature to adhere the packaging material 13 to the second outermost layer 32).

Thus, after the thermal adhesion process, the second outermost layer 32 can be prevented from having a thickness smaller than a predetermined thickness. Accordingly, for example, when an electrically conductive carbon black is used as the pigment 42 configuring the intermediate layer 33, the electrical insulation properties are sufficiently ensured between the barrier layer 24 (metal layer) configuring the packaging material 13 and the intermediate layer 33.

The amorphous insulating filler 39 may be an amorphous transparent insulating filler, or may be a colored amorphous insulating filler. Specifically, fillers that can be used as the amorphous insulating filler 39 include, for example, fillers made of metal oxides (e.g., alumina, silica, and the like), and fillers made of organic materials (e.g., polycarbonate, and epoxy resins).

From the viewpoint of cost of the electrical storage device terminal film 16, the amorphous insulating filler 39 is preferably an inexpensive amorphous silica filler.

If the amorphous insulating filler 39 has an average particle size smaller than 0.1 µm, the size of the amorphous insulating filler 39 protruding from the outer surface 38a of the second insulating layer 38 will be excessively small. Accordingly, it is difficult to obtain sufficient anti-blocking effect.

On the other hand, if the average particle size of the amorphous insulating filler 39 is larger than 20 µm, the amorphous insulating filler 39 will have an excessively large size. This results in reducing a contact area of the insulating layer 38 with the packaging material 13, and thus deteriorating adhesion.

Accordingly, by setting the average particle size of the amorphous insulating filler 39 to the range of 0.1 to 20 µm, sufficient anti-blocking effect can be obtained while adhesion can be improved.

The amorphous insulating filler 39 can be added to the second insulating layer 38 by an additive amount, for example, which is appropriately set within the range of 0.1 to 20 wt %.

If the additive amount of the amorphous insulating filler 39 contained in the second insulating layer 38 is smaller than 0.1 wt %, the amorphous insulating filler 39 protruding from the outer surface 38a of the first insulating layer 38 will be excessively decreased. Therefore, the effect of reducing the contact area between the electrical storage device terminal films 16 will be insufficient.

Thus, it is difficult to improve smoothness between the electrical storage device terminal films 16 contacting with each other (i.e. to improve the anti-blocking effect).

On the other hand, if the additive amount of the amorphous insulating filler 39 contained in the second insulating layer 38 is larger than 20 wt %, the amorphous insulating filler 39 protruded from the outer surface 38a of the second insulating layer 38 will be excessively increased. As a result, the contact area between the electrical storage device terminal films (i.e. between the insulating layers) will be considerably small.

Thus, it is difficult to sufficiently ensure adhesion between each electrical storage device terminal film 16 and the packaging material 13 after being thermally adhered (after being heat-sealed) (see FIG. 1).

For this reason, the additive amount of the amorphous insulating filler 39 contained in the second insulating layer 38 is ensured to be in the range of 0.1 to 20 wt %. Thus, smoothness between the electrical storage device terminal films 16 contacting with each other can be improved (i.e. anti-blocking effect is improved) without deteriorating adhesion between each electrical storage device terminal film 16 and the metal terminal 14 or the packaging material 13.

Depending on purposes, an average particle size Ra of the amorphous insulating filler 39 may be the same as or may be different from that of the amorphous insulating filler 36.

The intermediate layer 33 is arranged between the first and second outermost layers 31 and 32. The first surface of the intermediate layer 33 is covered with the first outermost layer 31, while the second surface thereof is covered with the second outermost layer 32.

The intermediate layer 33 is configured, including a third insulating layer 41 as an insulating resin layer arranged between the first and second outermost layers 31 and 32, and the pigment 42 (colorant) added to the third insulating layer 41.

The material used for the third insulating layer 41 is preferably a resin material having a high melting point which hardly melts in thermal adhesion and heat-sealing processes. Specifically, from the viewpoint of adhesion between the first and second outermost layers 31 and 32, for example, the material used for the third insulating layer 41 is preferably a polyolefin.

If insulating properties of the intermediate layer 33 are desired to be improved, materials used for the third insulating layer 41 may include, for example, polyesters, such as PET (polyethylene terephthalates), or heat resistant resins (e.g., polycarbonate and the like).

The third insulating layer 41 configuring the intermediate layer 33 is not necessarily required to have a single-layer structure. For example, the third insulating layer 41 may have a multi-layer structure in which a plurality of polyester layers are stuck to each other.

The thickness of the intermediate layer 33 (i.e. the thickness of the third insulating layer 41) can be appropriately set within the range, for example, of 10 to 200 μm, and is preferably in the range of 20 to 100 μm.

It is important that there is a balance between the intermediate layer 33 and the metal terminal 14 or the first outermost layer 31. Therefore, when the first outermost layer 31 or the metal terminal 14 has a large thickness, the intermediate layer 33 may have a large thickness accordingly.

The pigment 42 is used for coloring the intermediate layer 33. Coloring of the intermediate layer 33 can improve visibility of the electrical storage device terminal film 16, compared to the electrical storage device terminal film having an intermediate layer to which the pigment 42 is not added.

Thus, accuracy is improved in inspecting the electrical storage device terminal film 16 (specifically, for example, in inspecting whether the electrical storage device terminal film 16 is attached to the metal terminal 14, or in inspecting the position where the electrical storage device terminal film 16 is attached relative to the metal terminal 14).

Materials that can be used for the pigment 42 include, for example, organic pigments, inorganic pigments, and the like.

The organic pigments include, for example, azo pigments, phthalocyanine pigments, quinacridone pigments, anthraquinone pigments, dioxazine pigments, indigo-thioindigo pigments, perinone-perylene pigments, isoindolenine pigments, and the like. The inorganic pigments include carbon black pigments, titanium oxide pigments, cadmium pigments, lead pigments, chrome oxide pigments, and the like. Other pigments that can be used include fine powder of mica, fish scale guanine, and the like.

As specific examples of the organic pigments, the following pigments can be used.

The organic pigments that can be used to provide a yellow color include, for example, isoindolinone, isoindoline, quinophthalone, anthraquinone (flavanthrone), azomethine, xanthenes, and the like.

The organic pigments that can be used to provide an orange color, for example, diketopyrrolopyrrole, perylene, anthraquinone, perinone, quinacridone, and the like.

The organic pigments that can be used to provide a red color include, for example, anthraquinone, quinacridone, diketopyrrolopyrrole, perylene, indigoids, and the like.

The organic pigments that can be used to provide a violet color include, for example, oxazin (dioxazine), quinacridone, perylene, indigoids, anthraquinone, xanthenes, benzimidazolone, violanthrone, and the like.

The organic pigments that can be used to provide a blue color include, for example, phthalocyanine, anthraquinone, indigoids, and the like.

The organic pigments that can be used to provide a green color include, for example, phthalocyanine, perylene, azomethine, and the like.

As specific examples of the inorganic pigments, the following pigments can be used.

The inorganic pigments that can be used to provide a white color include, for example, Chinese white, lead white, lithpone, titanium dioxide, sedimentary barium sulfate, baryta powder, and the like.

The inorganic pigments that can be used to provide a red color include, for example, red lead, ferric oxide red, and the like.

The inorganic pigments that can be used to provide a yellow color include, for example, chrome yellow, zinc yellow (zinc yellow type 1 and zinc yellow type 2), and the like.

The inorganic pigments that can be used to provide a blue color include, for example, ultramarine blue, Prussian blue (potassium ferric ferrocyanide), and the like.

The inorganic pigments that can be used to provide a black color include, for example, carbon black, and the like.

The content of the organic and inorganic pigments in the third insulating layer 41 can be appropriately set within the range of 0.01 wt % to 3.00 wt %, inclusive.

As the pigment 42, carbon black, for example, is preferably used.

Thus, addition of carbon black to the third insulating layer 41 enables coloring of the intermediate layer 33 with a deep hue (specifically, with black color).

In this way, being further improved in visibility, the electrical storage device terminal film 16 can be more accurately inspected (specifically, for example, inspected as to whether the electrical storage device terminal film 16 is attached to the metal terminal 14, or as to the position of attachment of the electrical storage device terminal film 16 relative to the metal terminal 14, or the like).

In particular, the improved visibility is effective when the width of the metal terminal 14 is small and the width of the electrical storage device terminal film 16 is also small.

The particle size of carbon black serving as the pigment 42 can be appropriately selected within the range, for example, of 1 nm to 1 μm.

The additive amount of carbon black to be contained in the third insulating layer 41 is preferably in the range of 0.01 wt % to 3.00 wt %, inclusive, for example.

If the additive amount of carbon black to be contained in the third insulating layer 41 is less than 0.01 wt %, it is difficult to color the intermediate layer 33 with a deep hue. If the additive amount of carbon black to be contained in the third insulating layer 41 is more than 3.00 wt %, the electrical conductivity of the intermediate layer 33 becomes excessively high. Accordingly, it is difficult to sufficiently ensure electrical insulation properties between the intermediate layer 33 and the metal terminal 14.

In this regard, when the additive amount of carbon black to be contained in the third insulating layer 41 is in the range of 0.01 wt % to 3.00 wt %, inclusive, visibility of the electrical storage device terminal film 16 can be improved while electrical insulation properties can be sufficiently ensured.

It should be noted that an insulating filler (not shown) may be added to the third insulating layer 41. In other words, the intermediate layer 33 may include an insulating filler (not shown) as a constituent.

Thus, addition of an insulating filler (not shown) to the third insulating layer 41 can allow the insulating filler to serve as a spacer and thus can prevent the thickness of the intermediate layer 33 (i.e. the third insulating layer 41) from becoming smaller than a predetermined thickness after thermal adhesion.

Insulating fillers that can be used include, for example, fillers made of metal oxides (e.g., alumina, silica or the like), fillers made of organic materials (e.g., polycarbonate or an epoxy resin), and the like. From the viewpoint of cost of the electrical storage device terminal film 16, a silica filler is favorable as the insulating filler.

The insulating filler can have a spherical or amorphous shape, for example.

According to the electrical storage device terminal film of the present embodiment, the amorphous insulating filler 36 added to the first insulating layer 35 is arranged being protruded from the outer surface 35a of the first insulating layer 35. At the same time, the amorphous insulating filler 39 added to the second insulating layer 38 is arranged being protruded from the outer surface 38a of the second insulating layer 38. Thus, when the electrical storage device terminal films 16 are brought into contact with each other, the contact area therebetween can be reduced (contact area is decreased) while smoothness therebetween can be improved (i.e. anti-blocking effect can be improved).

Accordingly, for example, when an end of the electrical storage device terminal film 16 that has been taken up is drawn out, the occurrence of a blocking phenomenon can be minimized.

Further, the first insulating layer 35 contains the insulating filler 36 while the second insulating layer 38 contains the insulating filler 39. Thus, when the electrical storage device terminal film 16 is thermally adhered to the metal terminal 14, the amorphous insulating fillers 36 and 39 each serve as a spacer.

Thus, the thickness of each of the first and second insulating layers 35 and 38 is prevented from becoming smaller than a predetermined thickness. As a result, insulation properties can be improved in the first and second outermost layers 31 and 32 that contain the amorphous insulating fillers 36 and 39, respectively.

Accordingly, for example, when carbon black having electrical conductivity (pigment having good visibility) is added, as the pigment 42, to the third insulating layer 41, the first and second outermost layers 31 and 32 can electrically insulate the intermediate layer 33 having electrical conductivity from the metal terminal 14 and the barrier layer 24.

The electrical storage device 10 of the present embodiment having the electrical storage device terminal film 16 can achieve advantageous effects similar to those of the electrical storage device terminal film 16.

The present embodiment has been described by way of an example in which the amorphous insulating fillers 36 and 39 are added to the first and second insulating layers 35 and 38 configuring the first and second outermost layers 31 and 32, respectively, with the amorphous insulating fillers 36 and 39 being partially protruded from the outer surfaces 35a and 38a, respectively. The amorphous filler 36, 39 only has to be added to one of the first and second insulating layers 35 and 38 so as to be partially protruded from the outer surface of the insulating layer.

Specifically, the amorphous insulating filler 36, 39 only has to be added to at least one of the first and second insulating layers 35 and 38.

In this case, advantageous effects similar to those of the electrical storage device terminal film 16 of the foregoing embodiment can be obtained (specifically, the advantageous effects of improving smoothness between the electrical storage device terminals films 16 in contact with each other (i.e. improving anti-blocking effect) can be obtained).

Thus, when an end of the electrical storage device terminal film 16 that has been taken up is drawn out, the occurrence of a blocking phenomenon can be minimized.

Resin materials having different characteristics can be used as the first outermost layer 31 arranged covering part of the outer peripheral surface of the metal terminal 14, and as the second outermost layer 32 arranged being in contact with the packaging material 13 packaging the electrical storage device body 11 to thereby exert different effects. In this case, the amorphous insulating filler 36 can be added to only the first insulating layer 36 constituting the first outermost layer 31 arranged covering part of the outer peripheral surface of the metal terminal 14 to thereby color the first insulating layer 36. Thus, further advantageous effects of discriminating the first and second outermost layers 31 and 32 can be obtained.

When the amorphous insulating filler 36, 39 is added to only one of the first and second insulating layers 35 and 38, and when carbon black is added, as the pigment 42, to the third insulating layer 41 (i.e. when the intermediate layer has electrical conductivity), the outermost layer having the insulating layer as a constituent, to which the amorphous insulating filler 36, 39 has been added, may be thermally adhered to the metal terminal 14.

Thus, insulation properties are sufficiently ensured between the metal terminal 14 thermally adhered to the electrical storage device terminal film 16, and the intermediate layer 33 having electrical conductivity.

Alternatively, the two electrical storage device terminal films 16 shown in FIG. 3, in a state of being inverted, may be thermally adhered to the metal terminal 14. In other words, the two electrical storage device terminal films 16 may be arranged such that the second outermost layer 32 is brought into contact with the metal terminal 14.

In this case, advantageous effects similar to those of the electrical storage device terminal film 16 of the present embodiment described above can be obtained.

FIGS. 3 and 4 illustrate an example in which the intermediate layer 33 is colored using the pigment 42. Alternatively to this, a pigment 42 having no electrical conductivity may be added to at least one of the first and second insulating layers 35 and 38 instead of the third insulating layer 41 constituting the intermediate layer 33.

In this case, visibility of the electrical storage device terminal film 16 can be improved, similar to the intermediate layer 33 colored with the pigment 42 having no electrical conductivity. Accordingly, accuracy is improved in inspecting the electrical storage device terminal film 16.

FIGS. 3 and 4 illustrate an example in which the electrical storage device terminal film 16 has a three-layer structure. Alternatively, for example, fourth insulating layers (not shown) formed of an insulating resin may be arranged between the intermediate layer 33 and the first outermost layer 31 and between the intermediate layer 33 and the second outermost layer 32.

Thus, arrangement of the fourth insulating layers (not shown) between the intermediate layer 33 and the first outermost layer 31 and between the intermediate layer 33 and the second outermost layer 32 can improve insulation properties between the intermediate layer 33 and the barrier layer 24 (metal layer) constituting the packaging material 13, and insulation properties between the intermediate layer 33 and the metal terminal 14.

Referring to FIGS. 3 and 4, hereinafter will be briefly described a method for fabricating the electrical storage device terminal film 16 of the present embodiment.

The method for fabricating the electrical storage device terminal film 16 is not particularly limited. The electrical storage device terminal film 16 can be fabricated using a film-extrusion fabrication apparatus having a die, such as a round die used in inflation molding or a T-die used in die pressing, however, inflation molding for multi layers is preferably used.

Generally, materials used for the electrical storage device terminal film 16 include in many cases materials whose melt mass flow rate (hereinafter referred to as MFR) is equal to or lower than 5 g/10 min. Therefore, use of a T-die mostly causes unstable film formation, making fabrication difficult. On the other hand, inflation molding enables stable film formation if the materials mentioned above (materials whose MFR is equal to or lower than 5 g/10 min) are used. Accordingly, inflation molding is favorable for fabricating the electrical storage device terminal film 16.

When a roll is fabricated by inflation molding, the tube is conveyed, in general, being folded and an end of the folded tube is cut immediately before being taken up, followed by taking up the tube in two rolls. Owing to the improvement in smoothness between the electrical storage device terminal films 16, smoothness inside the tube during conveyance is improved. Accordingly, less crease or fold is caused during conveyance, thereby improving film-forming properties in inflation molding.

The following description addresses a method for fabricating the electrical storage device terminal film 16 by way of an example of using inflation molding (i.e. using an inflation molding apparatus).

Firstly, base materials for the first and second outermost layers 31 and 32 and the intermediate layer 33 are prepared.

Specifically, as the base material for the first outermost layer 31, an insulating filler-containing resin is prepared by uniformly kneading the amorphous insulating filler 36 of a predetermined additive amount into a material in which an insulating resin as the first insulating layer 35 is melted.

As the base material for the second outermost layer 32, an insulating filler-containing resin is prepared by uniformly kneading the amorphous insulating filler 39 of a predetermined additive amount into a material in which an insulating resin as the second insulating layer 38 is melted.

As the base material for the intermediate layer 33, a pigment-containing resin is prepared by uniformly kneading the pigment 42 of a predetermined additive amount into a material in which an insulating resin as the third insulating layer 41 is melted.

Then, the base materials of the first and second outermost layers 31 and 32 and the intermediate layer 33 are supplied to an inflation molding apparatus (not shown).

Then, the three base materials are extruded from an extrusion part of the inflation molding apparatus so that a three-layer structure (structure in which the first outermost layer 31, the second outermost layer 32 and the intermediate layer 33 are laminated) is formed while air is supplied from inside the laminate.

Then, the electrical storage device terminal film 16, while it is conveyed being inflated in a cylindrical shape, is flattened by a guide part, followed by folding it into a sheet-like shape by means of a pair of pinch rolls. Both ends of the folded tube are slit and thus a pair of (two strips of) films are taken up by take-up cores, thereby fabricating the electrical storage device terminal film 16 each taken up by a roller.

When the electrical storage device terminal film 16 is fabricated, the extrusion temperature is preferably in the range of 170 to 300° C., and more preferably 200 to 250° C., for example.

If the extrusion temperature is less than 170° C., melting of the insulating resins is insufficient, which leads to a high melting viscosity. As a result, extrusion from screws is likely to be unstable.

On the other hand, if the extrusion temperature is higher than 300° C., oxidation or deterioration of the insulating resins is considerably accelerated. As a result, quality of the electrical storage device terminal films 16 is lowered.

The revolution speed, blow ratio, pulling speed, and the like of each screw can be appropriately determined taking account of the setting of film thickness. The thickness ratio of the layers of the electrical storage device terminal film 16 can be easily controlled by changing the revolution speed of each of the screws.

The electrical storage device terminal film 16 of the present embodiment may be fabricated through dry lamination using an adhesive, or through sandwich lamination in which prepared insulating layers (insulating films) are laminated.

Referring to FIG. 3, a thermal adhesion process of the present embodiment will be described. In the thermal adhesion process, the electrical storage device terminal film 16 is thermally adhered to the metal terminal 14.

In the thermal adhesion process, melting of the first outermost layer 31 by heating is conducted concurrently with achieving intimate contact between the first outermost layer 31 and the metal terminal 14 by pressing, thereby thermally adhering the electrical storage device terminal film 16 to the metal terminal 14.

It is necessary to obtain sufficient adhesion and sealing between the electrical storage device terminal film 16 and the metal terminal 14 in the heat sealing process. To this end, the heat-sealing process is conducted until the melting point or more is reached for the insulating resin constituting the first outermost layer 31 (base material of the first insulating layer 35).

Specifically, for example, the temperature in the range of 140 to 170° C. can be used as a heating temperature for the electrical storage device terminal film 16. The processing time (sum of heating time and pressing time) is needed to be determined taking account of peeling strength and productivity. The processing time can be appropriately set in the range of 1 to 60 seconds, for example.

When production tact (productivity) of the electrical storage device terminal film 16 has priority, thermal adhesion may be conducted at a temperature exceeding 170° C., with the pressing time being shortened. In this case, the heating temperature can be in the range of 170 to 200° C., for example, while the pressing time can be in the range of 3 to 20 seconds, for example.

Second Embodiment

Figure 5:
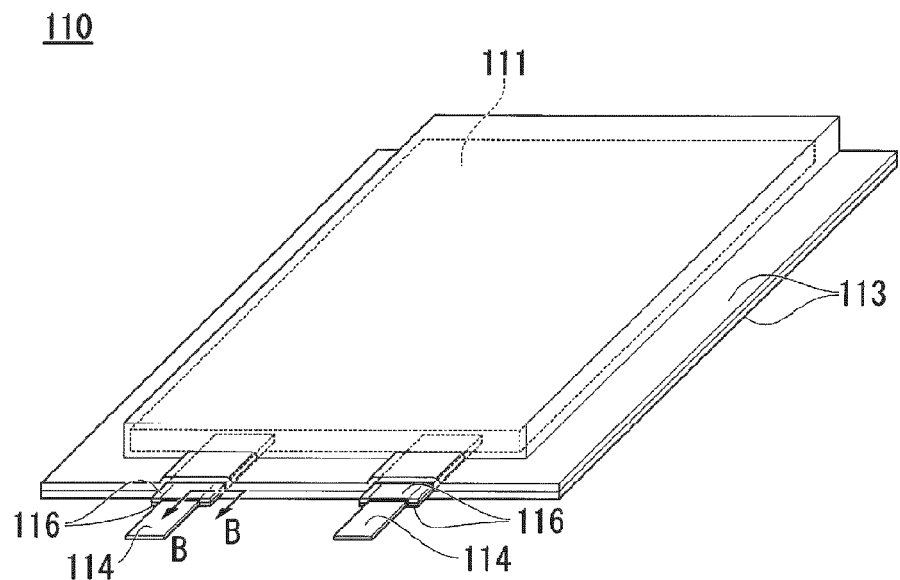
FIG. 5 is a perspective view illustrating a schematic configuration of an electrical storage device, according to a second embodiment of the present invention.

FIG. 5 is a schematic perspective view illustrating a configuration of an electrical storage device according to a second embodiment of the present invention. In FIG. 5, a lithium ion secondary battery is illustrated as an example of an electrical storage device 110. The following description is provided by way of this example.

The lithium ion secondary battery, whose configuration is shown in FIG. 5, is often called a battery pack or a battery cell.

Referring to FIG. 5, the electrical storage device 110 of the present embodiment, which is a lithium ion secondary battery, includes an electrical storage device body 111, a packaging material 113, a pair of metal terminals 114 (which are also called tab leads), and electrical storage device terminals films 116 (which are also called tab sealants).

The electrical storage device body 111 is a battery body that performs charge/discharge. The packaging material 113 is arranged so as to cover surfaces of the electrical storage device body 111 and partially contact the electrical storage device terminal films 116.

Figure 6:
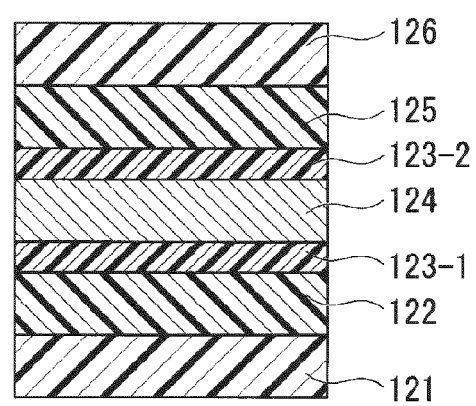
FIG. 6 is a cross-sectional view illustrating an example of a cross section of a packaging material shown in FIG. 5.

FIG. 6 is a cross-sectional view illustrating an example of a cross section of a packaging material shown in FIG. 5. In FIG. 6, the components which are identical with those of the structure shown in FIG. 5 are given the same reference signs.

Referring to FIG. 6, an example of a configuration of the packaging material 113 will be described.

The packaging material 113 has a seven-layer structure including an inner layer 121, an inner layer-side adhesive layer 122, an anti-corrosion treatment layer 123-1, a barrier layer 124 as a metal layer, an anti-corrosion treatment layer 123-2, an outer layer-side adhesive layer 125, and an outer layer 126, which are laminated in this order, from an inner side contacting the electrical storage device body 111. The inner layer 121, the inner layer-side adhesive layer 122, the anti-corrosion treatment layer 123-1, the barrier layer 124, the anti-corrosion treatment layer 123-2, the outer layer-side adhesive layer 125, and the outer layer 126 are similar to the inner layer 21, the inner layer-side adhesive layer 22, the anti-corrosion treatment layer 23-1, the barrier layer 24, the anti-corrosion treatment layer 23-2, the outer layer-side adhesive layer 25, respectively, of the first embodiment. Therefore, description is omitted.

Figure 7:
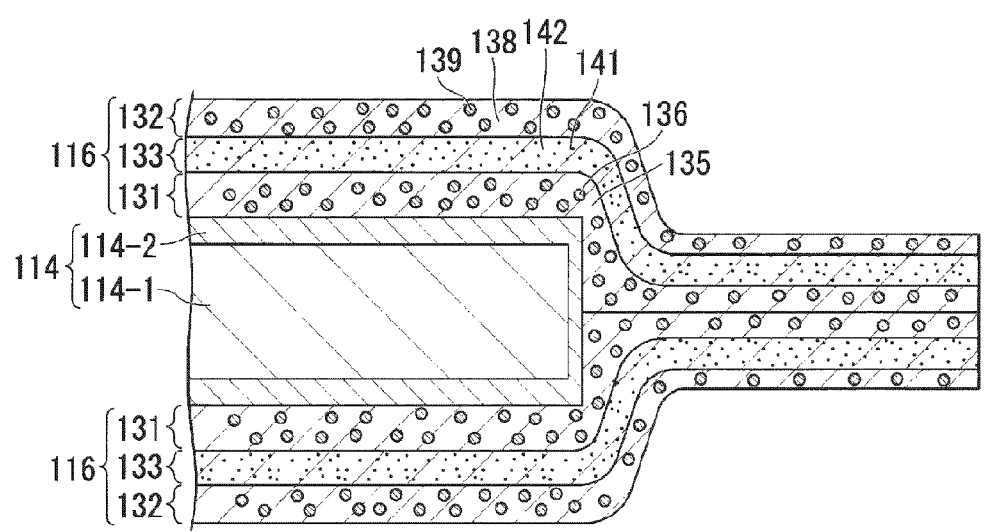
FIG. 7 is a cross-sectional view taken along the line B-B of FIG. 5, illustrating an electrical storage device terminal film and a metal terminal.

FIG. 7 is a cross-sectional view taken along the line B-B of FIG. 5, illustrating the electrical storage device terminal films and the metal terminal. In FIG. 7, the components identical with those of the structure shown in FIG. 5 are given the same reference signs.

Referring to FIGS. 5 and 7, a pair (two in FIG. 5) of metal terminals 114 each include a metal terminal body 114-1 and an anti-corrosion layer 114-2.

Of the pair of metal terminal bodies 114-1, one is electrically connected to a positive electrode of the electrical storage device body 111, and the other is electrically connected to a negative electrode of the electrical storage device body 111.

The pair of metal terminal bodies 114-1 are extended in a direction away from the electrical storage device body all, while being partially exposed from the packaging material 113. The pair of metal terminal bodies 114-1 may each be in a plate-like shape, for example.

As materials for the metal terminal bodies 114-1, metals can be used. The material serving as the metal terminal bodies 114-1 is preferably determined taking account, for example, of the structure of the electrical storage device body 111, materials of the components of the device body 111, and the like.

For example, when the electrical storage device 110 is a lithium ion secondary battery, aluminum is used as a positive electrode current collector while copper is used as a negative electrode current collector.

In this case, aluminum is preferably used as a material for the metal terminal body 114-1 connected to the positive electrode of the electrical storage device body 111. Taking account of corrosion resistance to an electrolytic solution, an aluminum material, such as IN30, having purity of 97% or more is preferably used, for example, as a material for the metal terminal body 114-1.

Further, when the metal terminal body 114-1 is bent, a metal material which is tempered by sufficient annealing is preferably used for the purpose of adding flexibility.

As a material used for the metal terminal body 114-1 connected to the negative terminal of the electrical storage device body 111, it is preferable to use copper whose surface is provided with a nickel-plated layer, or to use nickel.

The metal terminal body 114-1 has a thickness which depends on the size or capacity of the lithium ion secondary battery. If the lithium ion secondary battery is of a small size, the thickness of the metal terminal body 114-1 is preferably 50 µm or more, for example.

If the lithium ion secondary battery is of a large size so as to be applicable such as to electrical storage and vehicle installation, the thickness of the metal terminal body 114-1 can be appropriately set to within the range of 100 to 500 µm, for example.

The anti-corrosion layer 114-2 is arranged covering a surface of the metal terminal body 114-1. Lithium ion secondary batteries include an electrolytic solution that contains corrosive components, such as $LiPF_6$.

The anti-corrosion layer 114-2 minimizes corrosion of the metal terminal body 114-1 caused by the corrosive components, such as $LiPF_6$, contained in the electrolytic solution.

The electrical storage device terminal films 116 are arranged covering part of the outer peripheral surface of the metal terminal 114. The electrical storage device terminal films 116 are each configured by a first outermost layer 131 contacting the outer peripheral surface of the metal terminal 114, a second outermost layer 132 contacting the packaging material 113, and an intermediate layer 133 arranged between the first and second outermost layers 131 and 132.

The first outermost layer 131 is arranged covering one surface (first surface) of the intermediate layer 133 having electrical conductivity by its containing an electrically conductive pigment 142 that can create a black coloration. The first outermost layer 131 is configured, including a first insulating layer 135 that is an insulating resin layer, and an insulating filler 136.

The first insulating layer 135 (i.e. the first outermost layer 131) is arranged covering part of the outer peripheral surface of the metal terminal 114.

The first outermost layer 131, which is arranged covering the outer peripheral surface of the metal terminal 114, seals the metal terminal 114 in the circumferential direction, while achieving adhesion between the electrical storage device terminal film 116 and the metal terminal 114.

Accordingly, the material configuring the first insulating layer 135 is preferably a resin having good adhesiveness, for example. Resin materials that can be used for forming the first insulating layer 135 include, for example, acid-modified polyolefin resins or the like obtained by graft-modifying polyolefin resins with maleic anhydrides or the like.

The first insulating layer 135 can have a thickness in the range of 10 to 50 µm, for example.

The insulating filler 136 is added to the first insulating layer 135. The insulating filler 136 serves as a spacer that ensures the thickness of the first outermost layer 131, after heat-sealing process (after applying a predetermined pressure at a predetermined temperature for achievement of adhesion between the packaging material 113 and the second outermost layer 132).

Materials that can be used for the insulating filler 136 include, for example, fillers made of metal oxides (e.g., alumina, silica and the like), fillers made of organic materials (e.g., polycarbonate and epoxy resins), and the like.

The insulating filler 136 can be, for example, in an amorphous or spherical shape, but preferably in a spherical shape.

Being in a spherical shape, the insulating filler 136 can improve the function as a spacer. Thus, after the heat-sealing process, the first outermost layer 131 can have a larger thickness than when an amorphous filler is used. Thus, the first outermost layer 131 can electrically insulate the intermediate layer 133 containing the electrically conductive pigment 142 from the metal terminal 114.

The insulating filler 136 preferably has a particle size that is 1/30 to 1/2 the thickness of the first insulating layer 135.

Thus, the insulating filler 136, with its particle size being 1/30 to 1/2 the thickness of the first insulating layer 135, can sufficiently serve as a spacer without impairing thermal adhesion of the first outermost layer 131 to the metal terminal 114.

The insulating filler 136 is added to the first insulating layer 135 to achieve a content (concentration), for example, preferably in the range of 0.1 wt % to 20 wt %, inclusive.

If the content of the insulating filler 136 added to the first insulating layer 135 is less than 0.1 wt %, which is excessively small, the thickness of the first outermost layer 131 is excessively reduced when the metal terminal 114 is thermally adhered (when heat-sealed) thereto with an application of a predetermined pressure at a predetermined temperature.

Therefore, it will be difficult for the first outermost layer 131 to insulate the intermediate layer 133 having electrical conductivity from the metal terminal 114.

On the other hand, if the content of the insulating filler 136 added to the first insulating layer 135 is more than 20 wt %, the ratio of the first insulating layer 135 is lowered. Therefore, thermal adhesion (i.e. intimate contact) is impaired between the first outermost layer 131 and the metal terminal 114.

Accordingly, by adding the insulating filler 136 to the first insulating layer 135 with a content in the range of 0.1 wt % to 20 wt %, inclusive, the intermediate layer 133 having electrical conductivity can be electrically insulated from the metal terminal 114 without impairing thermal adhesion between the first outermost layer 131 and the metal terminal 114.

The second outermost layer 132 is arranged covering the other surface (second surface which is on the opposite side of the first surface) of the intermediate layer 133 having electrical conductivity by its containing the electrically conductive pigment 142. The second outermost layer 132 is configured, including a second insulating layer 138 that is an insulating resin layer, and an insulating filler 139.

The second insulating layer 138 (i.e. the second outermost layer 132) is thermally adhered to the packaging material 113 (specifically, the inner layer 121 shown in FIG. 6) so as to be in contact therewith.

The second insulating layer 138, which is thermally adhered to the packaging material 113, can seal the packaging material 113, while bringing the electrical storage device terminal film 116 into intimate contact with the packaging material 113 (specifically, the inner layer 121 shown in FIG. 6).

Thus, from the viewpoint of thermal adhesion between the electrical storage device terminal film 116 and the packaging material 113, the second insulating layer 138 is preferably made of a resin (e.g., a polyolefin resin) similar to the resin that is a base material of the inner layer 121.

The second insulating layer 138 can have a thickness in the range of 10 to 50 μm, for example.

The insulating filler 139 is added to the second insulating layer 138. The insulating filler 139 serves as a spacer that ensures the thickness of the second outermost layer 132, when a predetermined pressure is applied at a predetermined temperature to the packaging material 113 and the second outermost layer 132 to achieve thermal adhesion therebetween.

Materials that can be used for the insulating filler 139 include, for example, fillers made of metal oxides (e.g., alumina, silica and the like), fillers made of organic materials (e.g., polycarbonate, epoxy resins and the like), and the like.

The insulating fillers 136 and 139 may be, for example, of the same type and in the same shape.

Use of the insulating fillers 136 and 139 of the same type and in the same shape can facilitate preparation of these fillers compared to the case where two different types of fillers are prepared.

The insulating fillers 136 and 139 may be those which have different particle sizes. Use of the insulating fillers 136 and 139 with different particle sizes enables control of the thicknesses of the first and second outermost layers 131 and 132 according to purposes of use.

The insulating filler 139 may be, for example, in an amorphous or spherical shape, but is preferably in a spherical shape.

Use of the insulating filler 139 in a spherical shape can improve the function of the insulating filler 139 as a spacer. Thus, the second outermost layer 132 can have a larger thickness than in the case of using an amorphous filler, after application of a predetermined pressure, at a predetermine temperature, to the packaging material 113 and the second outermost layer 132 (i.e. after heat-sealing process) to achieve thermal adhesion therebetween.

Thus, the second outermost layer 132 can electrically insulate the intermediate layer 133 containing the electrically conductive pigment 142 from the barrier layer 124 constituting the packaging material 113.

The insulating filler 139 preferably has a particle size that is 1/30 to 1/2 the thickness of the second insulating layer 138.

Thus, the insulating filler 139, with its particle size being 1/30 to 1/2 the thickness of the second insulating layer 138, can sufficiently serve as a spacer without impairing thermal adhesion of the second outermost layer 132 to the packaging material 113.

The insulating filler 139 is added to the second insulating layer 138 to achieve a content (concentration), for example, in the range of 0.1 wt % to 20 wt %, inclusive.

If the content of the insulating filler 139 added to the second insulating layer 138 is less than 0.1 wt %, which is excessively small, there is a concern that the thickness of the second outermost layer 132 is reduced when the packaging material 113 is thermally adhered to the second outermost layer 132 through a heat-sealing process.

On the other hand, if the content of the insulating filler 139 added to the second insulating layer 138 is more than 20 wt %, the ratio of the second insulating layer 138 is lowered. Therefore, thermal adhesion (i.e. intimate contact) is likely to be impaired between the second outermost layer 132 and the packaging material 113.

Accordingly, by adding the insulating filler 139 to the second insulating layer 138 with a content in the range of 0.1 wt % to 20 wt %, inclusive, the intermediate layer 133 having electrical conductivity can be sufficiently electrically insulated from the barrier layer 124 without impairing thermal adhesion between the second outermost layer 132 and the packaging material 113.

The intermediate layer 133 is arranged between the first and second outermost layers 131 and 132. In the intermediate layer 133, the first surface is covered with the first outermost layer 131 while the second surface is covered with the second outermost layer 132.

The intermediate layer 133 is configured including a third insulating layer 141 that is an insulating resin layer arranged between the first and second outermost layers 131 and 132, and the electrically conductive pigment 142 serving as a colorant that can create a black coloration.

The material preferably used for the third insulating layer 141 is a resin material hardly melts in a heat-sealing process and having a high melting point. Specifically, a polyolefin is preferably used as the material for the third insulating layer 141, from the viewpoint of adhesion between the first and second outermost layers 131 and 132.

When insulation properties of the intermediate layer 133 are desired to be improved, the material used for the third insulating layer 141 may, for example, be a polyester, such as PET (polyethylene terephthalate) or a heat resistant resin (e.g. polycarbonate or the like)

The third insulating layer 141 constituting the intermediate layer 133 does not need to have a single-layer structure, but may have a multi-layer structure in which, for example, a plurality of polyester layers are stuck to each other via an adhesive.

The intermediate layer 133 preferably has a thickness (i.e. the third insulating layer 141 preferably has a thickness) which can be appropriately set, for example, in the range of 10 to 200 µm, and preferably in the range of 20 to 100 µm.

It is important that there is a balance between the intermediate layer 133 and the metal terminal 114 or the first outermost layer 131. Therefore, when the first outermost layer 131 or the metal terminal 114 has a large thickness, the intermediate layer 133 may have a large thickness accordingly.

The electrically conductive pigment 142, when added to the third insulating layer 141, serves as a colorant that colors the intermediate layer 133 in black. As the electrically conductive pigment 142, carbon black, black lead or the like, for example, can be used.

Thus, by permitting the intermediate layer 133 to contain the third insulating layer 141 as an insulating resin layer and the electrically conductive pigment 142 that can create a black coloration, the intermediate layer 133 can be colored with a deep hue (e.g., black).

In this way, being improved in visibility, the electrical storage device terminal film 116 can be accurately inspected (specifically, for example, inspected as to whether the electrical storage device terminal film 116 is attached to the metal terminal 114, or as to the position of attachment of the electrical storage device terminal film 116 relative to the metal terminal 114, or the like). In particular, the improved visibility is effective when the width of the metal terminal 114 is small and the width of the electrical storage device terminal film 116 is also small.

The particle size of the electrically conductive pigment 142 can be appropriately selected within a range, for example, of 1 nm to 1 µm.

The electrically conductive pigment 142 is added to the third insulating layer 141 to preferably achieve a content (concentration), for example, in the range of 0.01 wt % to 3.00 wt % inclusive.

If the content of the electrically conductive pigment 142 added to the third insulating layer 141 is less than 0.01 wt %, it will be difficult to color the intermediate layer with a deep hue. If the content of the electrically conductive pigment 142 added to the third insulating layer 141 is more than 3.00 wt %, the intermediate layer 133 has excessively high electrical conductivity. Thus, it will be difficult to sufficiently ensure electrical insulation properties between the intermediate layer 133 and the metal terminal 114.

Accordingly, the third insulating layer, with the addition of the electrically conductive pigment 142 by a content of 0.01 wt % to 3.00 wt %, inclusive, can improve visibility of the electrical storage device terminal film 116, while sufficiently ensuring electrical insulation properties.

The electrical storage device terminal film of the present embodiment includes the third insulating layer 141 arranged between the first and second outermost layers 131 and 132, and the intermediate layer 133 containing the electrically conductive pigment 142 that has been added to the third insulating layer 141. Thus, the intermediate layer 133 can be colored with a deep hue (black color).

In this way, being improved in visibility, the electrical storage device terminal film 116 can be accurately inspected (for example, inspected as to whether the electrical storage device terminal film 116 is attached to the metal terminal 114, or as to the position of attachment of the electrical storage device terminal film 116 relative to the metal terminal 114, or the like).

In particular, the improved visibility is effective when the width of the metal terminal 114 is small and the width of the electrical storage device terminal film 116 is also small.

Further, the first insulating layer 135 includes the first outermost layer 131 to which the insulating filler 136 has been added. Thus, after being heat-sealed, the insulating filler 136 can serve as a spacer that ensures the thickness of the first outermost layer 131.

Accordingly, when the electrical storage device terminal film 116 is arranged such that the first outermost layer 131 is brought into contact with the metal terminal 114, insulation properties are sufficiently ensured between the intermediate layer 133 having electrical conductivity due to its containing the electrical conductive pigment 142, and the metal terminal 114.

Further, the second insulating layer 138 includes the second outermost layer 132 to which the insulating filler 139 has been added. Thus, after being heat-sealed, the second outermost layer 132 is prevented from having a smaller thickness. Thus, the second outermost layer 132 can improve insulation properties between the barrier layer 24 (metal layer) constituting the packaging material, and the intermediate layer 133.

The electrical storage device 110 of the present embodiment including the electrical storage device terminal film 116 described above can obtain advantageous effects similar to those of the electrical storage device terminal film 116.

The present embodiment has been described by way of an example in which the first and second outermost layers 131 and 132 include respective insulating fillers. However, in the case of the configuration shown in FIG. 7, the first outermost layer 131 alone may include an insulating filler (the insulating filler 136 in this case) (i.e. the second outermost layer 132 does not have to necessarily include the insulating filler 139).

In this case, the electrically conductive pigment 142 is added to the insulating layer 141 constituting the intermediate layer 133 to color the intermediate layer 133 with a deep hue (black color). Thus, accuracy is improved in inspecting the electrical storage device terminal 116, and insulation properties are well ensured between the metal terminal 114 to which the electrical storage device terminal film 116 is thermally adhered, and the intermediate layer 133.

The two electrical storage device terminal films 116 shown in FIG. 7, in a state of being inverted, may be thermally adhered to the metal terminal 114. In other words, the two electrical storage device terminal films 116 may be arranged such that the second outermost layer 132 is brought into contact with the metal terminal 114.

In this case, advantageous effects similar to those of the electrical storage device terminal film of the present embodiment described above can be obtained.

Further, in this configuration (specifically, the configuration in which the second outermost layer 132 is in contact with the metal terminal 114), an insulating filler (the insulating filler 139 in this case) may be added to only the second outermost layer 132 (i.e. the first outermost layer 131 does not have to necessarily contain the insulating filler 136).

For example, the resin material used for the first insulating layer 135 constituting the first outermost layer 131 which is arranged partially covering the outer peripheral surface of the metal terminal 114 can have characteristics different from those of the resin material used for the second insulating layer 138 constituting the second outermost layer 132 which is arranged being in contact with the packaging material 113 packaging the electrical storage device body 111. In this case as well, the first and second outermost layers 131 and 132 can be discriminated by adding an insulating filler only to the first insulating layer 136.

In the electrical storage device terminal film configured in this way, the electrically conductive pigment 142 is added to the third insulating layer 141 constituting the intermediate layer 133 to create a coloration of the intermediate layer 133 with a deep hue (black color). Thus, accuracy can be improved in inspecting the electrical storage device terminal film 116, and insulation properties can be well ensured between the metal terminal 114 to which the electrical storage device terminal film 116 is thermally adhered, and the intermediate layer 133.

As described above, in the present invention, an insulating filler only has to be added to at least one of the first and second insulating layers 135 and 138.

Referring to FIG. 7, hereinafter is described a method for fabricating the electrical storage device terminal film 116 of the present embodiment.

There is no particular limitation in the method for fabricating the electrical storage device terminal film 116. The electrical storage device terminal film 116 can be fabricated by using, for example, extrusion molding, such as a T-die method or a round die method, or inflation molding. Among them, inflation molding for multi layers is preferably used.

Generally, materials used for the electrical storage device terminal film 116 include in many cases materials whose melt mass flow rate (hereinafter referred to as MRF) is equal to or lower than 5 g/10 min. Therefore, use of a T-die mostly causes unstable film formation, making fabrication difficult. On the other hand, inflation molding enables stable film formation when the materials mentioned above (materials whose MFR is equal to or lower than 5 g/10 min) are used. Accordingly, inflation molding is favorable for fabricating the electrical storage device terminal film 116.

As the base material for the first outermost layer 131, an insulating filler-containing resin is prepared by uniformly kneading the insulating filler 136 for achieving a predetermined content into a material in which an insulating resin as the first insulating layer 135 is melted.

As the base material for the second outermost layer 132, an insulating filler-containing resin is prepared by uniformly kneading the insulating filler 139 for achieving a predetermined content into a material in which an insulating resin as the second insulating layer 138 is melted.

As the base material for the intermediate layer 133, an electrically conductive pigment-containing resin is prepared by uniformly kneading the electrically conductive pigment 142 for achieving a predetermined content into a material in which an insulating resin as the third insulating layer 141 is melted.

Then, the two insulating filler-containing resins and the electrically conductive pigment-containing resin are supplied to the apparatus.

For example, the extrusion temperature in fabricating the electrical storage device terminal film 116 is preferably in the range of 170 to 300° C., and more preferably in the range of 200 to 250° C.

If the extrusion temperature is less than 170° C., melting of the insulating resins is insufficient, which leads to a high melting viscosity. As a result, extrusion from screws is likely to be unstable.

On the other hand, if the extrusion temperature is higher than 300° C., oxidation or deterioration of the insulating resins is considerably accelerated. As a result, quality of the electrical storage device terminal film 116 is lowered.

The revolution speed, blow ratio, pulling speed, and the like of each screw can be appropriately determined taking account of the setting of film thickness. The thickness ratio of the layers of the electrical storage device terminal film 116 can be easily controlled by changing the revolution speed of each of the screws.

The electrical storage device terminal film 116 of the present embodiment may be fabricated through dry lamination using an adhesive, or through sandwich lamination in which prepared insulating layers (insulating films) are laminated.

Referring to FIG. 7, a thermal adhesion process of the present embodiment will be described. In the thermal adhesion process, the electrical storage device terminal film 116 is thermally adhered to the metal terminal 114.

In the thermal adhesion process, melting of the first outermost layer 131 by heating is conducted concurrently with achieving intimate contact between the first outermost layer 131 and the metal terminal 114 by pressing, thereby thermally adhering the electrical storage device terminal film 116 to the metal terminal 114.

It is necessary to obtain sufficient adhesion and sealing between the electrical storage device terminal film 116 and the metal terminal 114 in the thermal adhesion process described above. To this end, heating is conducted until the melting point or more is reached for the insulating resin constituting the first outermost layer 131 (base material of the first insulating layer 135).

Specifically, for example, the temperature in the range of 140 to 170° C. can be used as a heating temperature for the electrical storage device terminal film 116. The processing time (sum of heating time and pressing time) is needed to be determined taking account of peeling strength and productivity. The processing time can be appropriately set in the range of 1 to 60 seconds, for example.

When production tact (productivity) of the electrical storage device terminal film 116 has priority, thermal adhesion may be conducted at a temperature exceeding 170° C., with the pressing time being shortened. In this case, the heating temperature can be in the range of 170 to 200° C., for example, while the pressing time can be in the range of 3 to 20 seconds, for example.

Preferred embodiments of the present invention have so far be specifically described. However, the present invention should not be construed as being limited to the specific embodiments but may be variously modified or changed within the range of the spirit of the present invention recited in the claims.

For example, the outermost layers indicated by reference signs 31 and 131 may be referred to as second outermost layers of the present invention. In this case, the outermost layers indicated by the reference signs 32 and 132 are referred to as first outermost layers of the present invention.

For example, fourth insulating layers (not shown) made of an insulating resin may be arranged between the intermediate layer 133 and the first outermost layer 131 and between the intermediate layer 133 and the second outermost layer 132.

Thus, arrangement of the fourth insulating layers (not shown) between the intermediate layer 133 and the first outermost layer 131 and between the intermediate layer 133 and the second outermost layer 132 can improve insulation properties between the intermediate layer 133 and the barrier layer 124 (metal layer) constituting the packaging material 113, and insulation properties between the intermediate layer 133 and the metal terminal 114 (see FIGS. 5 to 7).

EXAMPLES

The following description sets forth some examples of the present invention. However, the present invention should not be construed as being limited at all by the following examples.

First, referring to Examples A1 to A17 and Comparative Examples A1 and A2, examples corresponding to the foregoing first embodiment will be described.

Example A1

Preparation of Positive Tab and Negative Tab

Referring to FIG. 3, the following description sets forth a method for preparing a positive tab and a negative tab (i.e. the structure made up of the metal terminal 14 (also referred to as tab lead) and the pair of electrical storage device terminal films 16 (also referred to as tab sealants)) of Example A1

First, a thin aluminum plate with a width of 5 mm, a length of 20 mm and a thickness of 100 µm was prepared as the metal terminal body 14-1 for use as a positive electrode. Then, non-chrome surface treatment was performed with respect to surfaces of the thin aluminum plate to form the anti-corrosion layer 14-2 (non-chrome surface treatment layer). Thus, there was prepared the positive-electrode side metal terminal 14 (hereinafter is referred to as positive electrode metal terminal 14A for convenience's sake) including the thin aluminum plate and the non-chrome surface treatment layer.

Then, a thin nickel plate with a width of 5 mm, a length of 20 mm and a thickness of 100 µm was prepared as the metal terminal body 14-1 for use as a negative electrode. Then, non-chrome surface treatment was performed with respect to surfaces of the thin nickel plate to form the anti-corrosion layer 14-2 (non-chrome surface treatment layer). Thus, there was prepared the negative-electrode side metal terminal 14 (hereinafter is referred to as negative electrode metal terminal 14B for convenience's sake) including the thin nickel plate and the non-chrome surface treatment layer.

Then, amorphous silica (the amorphous insulating filler 36) with an average particle size of 5.0 µm was added, at a concentration of 5.0 wt %, to an acid-modified polypropylene serving as the first insulating layer 35, followed by mixing, thereby preparing a base material for the first outermost layer 31.

Then, amorphous silica (the amorphous insulating filler 39) with an average particle size of 5.0 µm was added, at a concentration of 5.0 wt %, to an acid-modified polypropylene serving as the second insulating layer 38, followed by mixing, thereby preparing a base material for the second outermost layer 32.

Then, carbon black (the pigment 42) with an average particle size of 50 nm was added, at a concentration of 0.1 wt %, to a polypropylene serving as the base material for the intermediate layer 33, followed by mixing, thereby preparing a base material for the intermediate layer 33.

Then, the base materials for the first outermost layer 31, the second outermost layer 32, and the intermediate layer 33 were set to an inflation-type film extrusion manufacturing apparatus (Co—OI model) manufactured by Sumitomo Heavy Industries Modern, Ltd. Using the film extrusion manufacturing apparatus, the three base materials were extruded to prepare a laminate film (film serving as a base material for the electrical storage device terminal film 16).

In this case, the laminate film was formed such that the first insulating layer 35 had a thickness of 30 µm, the second insulating layer 38 had a thickness of 30 µm, and the third insulating layer 41 had a thickness of 40 µm.

Melting temperature was set to 210° C. for the base materials for the first and second outermost layers 31 and 32 and the intermediate layer 33. Blow rate was set to 2.2.

Then, the laminate film was cut to prepare four electrical storage device terminals films 16 each having a width of 9 mm and a length of 5 mm.

After that, the positive electrode metal terminal 14A was sandwiched between two electrical storage device terminal films 16. The two electrical storage device terminal films 16 were heated at 155° C. for 10 seconds to thermally adhere the positive electrode metal terminal 14A to the two electrical storage device terminal films 16. Thus, there was prepared a positive electrode tab made up of the positive electrode metal terminal 14A and the two electrical storage device terminal films 16.

Then, in a similar manner, the negative electrode metal terminal 14B was thermally adhered to two electrical storage device terminal films 16 that sandwiched the negative electrode metal terminal 14B therebetween. Thus, there was prepared a negative electrode tab made up of the negative electrode metal terminal 14B and the two electrical storage device terminal films 16.

<Preparation of Evaluation Battery Pack>

Then, the packaging material 13 in a 50 mm×90 mm size rectangular shape was prepared. The packaging material 13 had a lamination of a nylon layer with a thickness of 25 (the outer layer 26), a polyester polyol adhesive with a thickness of 5 µm (the outer-side adhesive layer 25), an annealed A8079 aluminum foil with a thickness of 40 µm (the barrier layer 24), a first anti-corrosion treatment layer formed by applying non-chrome surface treatment to a surface of an aluminum foil (the anti-corrosion treatment layer 23-1), a second anti-corrosion treatment layer formed by applying non-chrome surface treatment to the other surface of the aluminum foil (the anti-corrosion treatment layer 23-2), an acid-modified polypropylene layer with a thickness of 30 μm (the inner layer-side adhesive layer 22), and a polypropylene layer with a thickness of 40 μm (the inner layer 21).

Then, the packaging material 13 was folded into two at middle points of respective long sides thereof to form two folds. The packaging material 13 in two folds with a length of 45 mm was heat-sealed, with the positive and negative electrode tabs being sandwiched, on one side, between the folds, to thermally adhere the packaging material 13 to the positive and negative electrode tabs. The heat sealing was performed at 190° C. for 5 seconds.

After that, 2 mL electrolytic solution obtained by adding lithium hexafluorophosphate to a mixed solution of diethyl carbonate and ethylene carbonate was filled in the packaging material 13.

Then, the remaining side of the packaging material 13 was heat-sealed. The heat sealing in this case was performed at 190° C. for 3 seconds.

In this way, there was prepared a battery pack that can be subjected to tab evaluation, with no electrical storage device body 11 being sealed therein.

Example A2

In Example A2, laminate films of Example A2 (films each serving as the base material for the electrical storage device terminal film 16) were prepared in a manner similar to the laminate films of Example A1, except that the amorphous insulating filler 36 was not added to the first insulating layer 35.

After that, an evaluation battery pack of Example A2 was prepared in a manner similar to that of Example A1.

Example A3

In Example A3, laminate films of Example A3 (films each serving as the base material for the electrical storage device terminal film 16) were prepared in a manner similar to the laminate films of Example A1, except that the amorphous insulating filler 39 was not added to the second insulating layer 38.

After that, an evaluation battery pack of Example A3 was prepared in a manner similar to that of Example A1.

Example A4

In Example A4, laminate films of Example A4 (films each serving as the base material for the electrical storage device terminal film 16) were prepared in a manner similar to the laminate films of Example A1, except that the average particle size of each of the amorphous insulating fillers 36 and 39 was changed to 3.0 μm and the addition concentration of each of the amorphous insulating fillers 36 and 39 was changed to 10.0 wt %.

After that, an evaluation battery pack of Example A4 was prepared in a manner similar to that of Example A1.

Example A5

In Example A5, laminate films of Example A5 (films each serving as the base material for the electrical storage device terminal film 16) were prepared in a manner similar to the laminate films of Example A1, except that the average particle size of each of the amorphous insulating fillers 36 and 39 was changed to 10.0 μm and the addition concentration of each of the amorphous insulating fillers 36 and 39 was changed to 2.0 wt %.

After that, an evaluation battery pack of Example A5 was prepared in a manner similar to that of Example A1.

Example A6

In Example A6, laminate films of Example A6 (films each serving as the base material for the electrical storage device terminal film 16) were prepared in a manner similar to the laminate films of Example A1, except that the first and second insulating layers 35 and 38 each had a thickness of 10 μm and the third insulating layer 41 had a thickness of 20 μm.

After that, an evaluation battery pack of Example A6 was prepared in a manner similar to that of Example A1.

Example A7

In Example A7, laminate films of Example A7 (films each serving as the base material for the electrical storage device terminal film 16) were prepared in a manner similar to the laminate films of Example A1, except that the first and second insulating layers 35 and 38 each had a thickness of 40 μm, the third insulating layer 41 had a thickness of 20 μm, and the average particle size of each of the amorphous insulating fillers 36 and 39 was 3.0 μm.

After that, an evaluation battery pack of Example A7 was prepared in a manner similar to that of Example A1.

Example A8

In Example A8, laminate films of Example A8 (films each serving as the base material for the electrical storage device terminal films 16) were prepared in a manner similar to the laminate films of Example A1, except that the third insulating layer 41 was permitted to contain carbon black (the pigment 42) by 0.5 wt %.

After that, an evaluation battery pack of Example A8 was prepared in a manner similar to that of Example A1.

Example A9

In Example A9, laminate film of Example A9 (films each serving as the base material for the electrical storage device terminal film 16) were prepared in a manner similar to the laminate films of Example A1, except that the average particle size of each of the amorphous insulating fillers 36 and 39 was changed to 1.0 μm, and the third insulating layer 41 was permitted to contain carbon black (the pigment 42) at a concentration of 0.01 wt %.

After that, an evaluation battery pack of Example A9 was prepared in a manner similar to that of Example A1.

Example A10

In Example A10, laminate films of Example A10 (films each serving as the base material for the electrical storage device terminal film 16) were prepared in a manner similar to the laminate films of Example A1, except that the third insulating layer 41 was permitted to contain phthalocyanine blue (the pigment 42) at a concentration of 0.2 wt %.

After that, an evaluation battery pack of Example A10 was prepared in a manner similar to that of Example A1.

Example A11

In Example A11, laminate films of Example A11 (films each serving as the base material for the electrical storage device terminal film 16) were prepared in a manner similar to the laminate films of Example A1, except that the third insulating layer 41 was permitted to contain titanium dioxide (the pigment 42) by 0.2 wt %.

After that, an evaluation battery pack of Example A11 was prepared in a manner similar to that of Example A1.

Example A12

In Example A12, laminate films of Example A12 (films each serving as the base material for the electrical storage device terminal film 16) were prepared in a manner similar to the laminate films of Example A1, except that a polypropylene layer (10 μm) was interposed between the intermediate layer 33 and the second outermost layer 32.

After that, an evaluation battery pack of Example A12 was prepared in a manner similar to that of Example A1.

Example A13

In Example A13, laminate films of Example A13 (films each serving as the base material for the electrical storage device terminal films 16) were prepared in a manner similar to the laminate films of Example A1, except that the average particle size of each of the amorphous insulating fillers 36 and 39 was 0.03 μm, and carbon black was not added to the third insulating layer 41.

After that, an evaluation battery pack of Example A13 was prepared in a manner similar to that of Example A1.

Example A14

In Example A14, laminate films of Example A14 (films each serving as the base material for the electrical storage device terminal film 16) were prepared in a manner similar to the laminate films of Example A1, except that the concentration of each of the amorphous insulating fillers 36 and 39 was 0.03 wt %.

After that, an evaluation battery pack of Example A14 was prepared in a manner similar to that of Example A1.

Example A15

In Example A15, laminate films of Example A15 (films each serving as the base material for the electrical storage device terminal film 16) were prepared in a manner similar to the laminate films of Example A1, except that the concentration of each of the amorphous insulating fillers 36 and 39 was 0.03 wt %, and carbon black (the pigment 42) was added to the insulating layer 41 by 5.0 wt %.

After that, an evaluation battery pack of Example A15 was prepared in a manner similar to that of Example A1.

Example A16

In Example A16, laminate films of Example A16 (films each serving as the base material for the electrical storage device terminal films 16) were prepared in a manner similar to the laminate films of Example A1, except that the first and second insulating layers 35 and 38 each had a thickness of 15 μm, the third insulating layer 41 had a thickness of 30 μm, the average particle size of each of the amorphous insulating fillers 36 and 39 was 10.0 μm, and carbon black was not added to the third insulating layer 41.

After that, an evaluation battery pack of Example A16 was prepared in a manner similar to that of Example A1.

Example A17

In Example A17, laminate films of Example A17 (films each serving as the base material for the electrical storage device terminal film 16) were prepared in a manner similar to the laminate films of Example A1, except that the average particle size of each of the amorphous insulating fillers 36 and 39 was 25.0 μm.

After that, an evaluation battery pack of Example A17 was prepared in a manner similar to that of Example A1.

Comparative Example A1

In Comparative Example A1, laminate films of Comparative Example A1 (films each serving as the base material for the electrical storage device terminal film 16) were prepared in a manner similar to the laminate films of Example A1, except that the first outermost layer 31 was formed of only the first insulating layer 35, and the second outermost layer 32 was formed of only the second insulating layer 38, without using the amorphous insulating fillers 36 and 39.

After that, an evaluation battery pack of Comparative Example A1 was prepared in a manner similar to that of Example A1.

Comparative Example A2

In Comparative Example A2, laminate films of Comparative Example A2 (films each serving as the base material for the electrical storage device terminal film 16) were prepared in a manner similar to the laminate films of Example A1, except that spherical silica with an average particle size of 0.5 μm was added at a concentration of 2 wt %, instead of using the amorphous insulating fillers 36 and 39.

After that, an evaluation battery pack of Comparative Example A2 was prepared in a manner similar to that of Example A1.

<Evaluation on Anti-Blocking Properties (AB Properties) for Laminate Films of Examples A1 to A17 and Comparative Examples A1 and A2>

First, the laminate films (base materials for the electrical storage device terminal films 16) prepared in Example A1 were overlaid with each other, with the first outermost layers 31 being in face-to-face relation, followed by applying a pressure of 0.5 MPa. The resultant object was stored at 40° C. for 24 hours and then peeling of the laminate film was tested.

In the evaluation of anti-blocking properties (AB properties), a laminate film peeling without resistance was evaluated as ⊙ (very good), a laminate film peeling with a little resistance was evaluated as ○ (good) and a laminate film only peeling with difficulty and generating a peeling sound when peeled was evaluated as x (bad).

Then, the laminate films of Examples A2 to A17 and the laminate films of Comparative Examples A1 and A2 were evaluated as to anti-blocking properties in a manner similar to Example A1.

Table 4 shows the evaluations of anti-blocking properties for the laminate films of Examples A2 to A11 and the laminate films of Comparative Examples A1 and A2.

Tables 1 to 3 show thickness, type or average particle size of insulating filler, concentration of pigment (specifically, carbon black, phthalocyanine blue or titanium oxide), and the like of each of the layers constituting the laminate films of Examples A2 to A17 and the laminate films of Comparative Examples A1 and A2.

TABLE 1

| | Insulating filler present in first outermost layer? | Type of insulating filler in first outermost layer | Average particle size of insulating filler in first outermost layer (μm) | Concentration of insulating filler in first outermost layer (wt %) | Thickness of first insulating layer (μm) |
|---|---|---|---|---|---|
| Ex. A1 | Yes | Amorphous silica | 5.0 | 5.0 | 30 |
| Ex. A2 | No | — | — | 0.0 | 30 |
| Ex. A3 | Yes | Amorphous silica | 5.0 | 5.0 | 30 |
| Ex. A4 | Yes | Amorphous silica | 3.0 | 10.0 | 30 |
| Ex. A5 | Yes | Amorphous silica | 10.0 | 2.0 | 30 |
| Ex. A6 | Yes | Amorphous silica | 5.0 | 5.0 | 10 |
| Ex. A7 | Yes | Amorphous silica | 3.0 | 5.0 | 40 |
| Ex. A8 | Yes | Amorphous silica | 5.0 | 5.0 | 30 |
| Ex. A9 | Yes | Amorphous silica | 1.0 | 5.0 | 30 |
| Ex. A10 | Yes | Amorphous silica | 5.0 | 5.0 | 30 |
| Ex. A11 | Yes | Amorphous silica | 5.0 | 5.0 | 30 |
| Ex. A12 | Yes | Amorphous silica | 5.0 | 5.0 | 30 |
| Ex. A13 | Yes | Amorphous silica | 0.03 | 5.0 | 30 |
| Ex. A14 | Yes | Amorphous silica | 5.0 | 0.03 | 30 |
| Ex. A15 | Yes | Amorphous silica | 5.0 | 0.03 | 30 |
| Ex. A16 | Yes | Amorphous silica | 10.0 | 5.0 | 15 |
| Ex. A17 | Yes | Amorphous silica | 25.0 | 5.0 | 30 |
| Comp. Ex. A1 | No | — | — | 0.0 | 30 |
| Comp. Ex. A2 | Yes | Spherical silica | 0.5 | 2.0 | 30 |

TABLE 2

| | Insulating filler present in second outermost layer? | Type of insulating filler in second outermost layer | Average particle size of insulating filler in second outermost layer (μm) | Concentration of insulating filler in second outermost layer (wt %) | Thickness of second insulating layer (μm) |
|---|---|---|---|---|---|
| Ex. A1 | Yes | Amorphous silica | 5.0 | 5.0 | 30 |
| Ex. A2 | Yes | Amorphous silica | 5.0 | 5.0 | 30 |
| Ex. A3 | No | — | — | 0.0 | 30 |
| Ex. A4 | Yes | Amorphous silica | 3.0 | 10.0 | 30 |
| Ex. A5 | Yes | Amorphous silica | 10.0 | 2.0 | 30 |
| Ex. A6 | Yes | Amorphous silica | 5.0 | 5.0 | 10 |
| Ex. A7 | Yes | Amorphous silica | 3.0 | 5.0 | 40 |
| Ex. A8 | Yes | Amorphous silica | 5.0 | 5.0 | 30 |
| Ex. A9 | Yes | Amorphous silica | 1.0 | 5.0 | 30 |

TABLE 2-continued

|  | Insulating filler present in second outermost layer? | Type of insulating filler in second outermost layer | Average particle size of insulating filler in second outermost layer (μm) | Concentration of insulating filler in second outermost layer (wt %) | Thickness of second insulating layer (μm) |
|---|---|---|---|---|---|
| Ex. A10 | Yes | Amorphous silica | 5.0 | 5.0 | 30 |
| Ex. A11 | Yes | Amorphous silica | 5.0 | 5.0 | 30 |
| Ex. A12 | Yes | Amorphous silica | 5.0 | 5.0 | 30 |
| Ex. A13 | Yes | Amorphous silica | 0.03 | 5.0 | 30 |
| Ex. A14 | Yes | Amorphous silica | 5.0 | 0.03 | 30 |
| Ex. A15 | Yes | Amorphous silica | 5.0 | 0.03 | 30 |
| Ex. A16 | Yes | Amorphous silica | 10.0 | 5.0 | 15 |
| Ex. A17 | Yes | Amorphous silica | 25.0 | 5.0 | 30 |
| Comp. Ex. A1 | No | — | — | 0.0 | 30 |
| Comp. Ex. A2 | Yes | Spherical silica | 0.5 | 2.0 | 30 |

TABLE 3

|  | Thickness of third insulating layer (μm) | Concentration of carbon black added to third insulating layer (wt %) | Concentration of phthalocyanine blue added to third insulating layer (wt %) | Concentration of titanium dioxide added to third insulating layer (wt %) | Polypropylene layer (10 μm) present between intermediate layer and second outermost layer? |
|---|---|---|---|---|---|
| Ex. A1 | 40 | 0.1 | 0 | 0 | No |
| Ex. A2 | 40 | 0.1 | 0 | 0 | No |
| Ex. A3 | 40 | 0.1 | 0 | 0 | No |
| Ex. A4 | 40 | 0.1 | 0 | 0 | No |
| Ex. A5 | 40 | 0.1 | 0 | 0 | No |
| Ex. A6 | 20 | 0.1 | 0 | 0 | No |
| Ex. A7 | 20 | 0.1 | 0 | 0 | No |
| Ex. A8 | 40 | 0.5 | 0 | 0 | No |
| Ex. A9 | 40 | 0.01 | 0 | 0 | No |
| Ex. A10 | 40 | 0 | 0.2 | 0 | No |
| Ex. A11 | 40 | 0 | 0 | 0.2 | No |
| Ex. A12 | 40 | 0.1 | 0 | 0 | Yes |
| Ex. A13 | 40 | 0 | 0 | 0 | No |
| Ex. A14 | 40 | 0.1 | 0 | 0 | No |
| Ex. A15 | 40 | 5.0 | 0 | 0 | No |
| Ex. A16 | 30 | 0 | 0 | 0 | No |
| Ex. A17 | 40 | 0.1 | 0 | 0 | No |
| Comp. Ex. A1 | 40 | 0.1 | 0 | 0 | No |
| Comp. Ex. A2 | 40 | 0.1 | 0 | 0 | No |

TABLE 4

|  | Evaluation of AB properties | Evaluation of adhesiveness | Evaluation of insulating properties | Evaluation of sensing rate |
|---|---|---|---|---|
| Ex. A1 | ⊙ | ⊙ | ⊙ | ⊙ |
| Ex. A2 | ⊙ | ⊙ | ⊙ | ⊙ |
| Ex. A3 | ⊙ | ⊙ | ⊙ | ⊙ |
| Ex. A4 | ⊙ | ⊙ | ⊙ | ⊙ |
| Ex. A5 | ⊙ | ⊙ | ⊙ | ⊙ |
| Ex. A6 | ⊙ | ⊙ | ⊙ | ⊙ |
| Ex. A7 | ⊙ | ⊙ | ⊙ | ⊙ |
| Ex. A8 | ⊙ | ⊙ | ⊙ | ⊙ |
| Ex. A9 | ⊙ | ⊙ | ⊙ | ⊙ |
| Ex. A10 | ⊙ | ⊙ | ⊙ | ⊙ |
| Ex. A11 | ⊙ | ⊙ | ⊙ | ⊙ |
| Ex. A12 | ⊙ | ⊙ | ⊙ | ⊙ |
| Ex. A13 | ○ | ○ | X | X |
| Ex. A14 | ○ | ○ | ○ | ⊙ |

TABLE 4-continued

|  | Evaluation of AB properties | Evaluation of adhesiveness | Evaluation of insulating properties | Evaluation of sensing rate |
|---|---|---|---|---|
| Ex. A15 | ○ | ⊙ | X | ⊙ |
| Ex. A16 | ⊙ | X | ⊙ | X |
| Ex. A17 | ⊙ | X | ⊙ | ⊙ |
| Comp. Ex. A1 | X | ⊙ | X | ⊙ |
| Comp. Ex. A2 | X | ⊙ | ⊙ | ⊙ |

<Adhesiveness Evaluation Test for Evaluation Battery Packs of Examples A1 to A17 and Comparative Examples A1 and A2>

100 test specimens were prepared for each of the evaluation battery packs of Examples A1 to A17 and the evaluation battery packs of Comparative Examples A1 and A2. After that, the 100 test specimens of each of the evaluation battery packs of Examples A1 to A17 and the evaluation battery packs of Comparative Examples A1 and A2 were stored in a room kept at 80° C. for 4 weeks. Then, leakage of the sealed electrolytic solution was confirmed.

In the evaluation, where none of the test specimens caused leakage was evaluated with ⊙ (very good) and where any one of the test specimens caused leakage was evaluated with x (bad).

Table 4 shows evaluations on adhesiveness for the evaluation battery packs of Examples A1 to A17 and the evaluation battery packs of Comparative Examples A1 and A2.

<Evaluation Test on Insulation Properties for Evaluation Battery Packs of Examples A1 to A17 and Comparative Examples A1 and A2>

First, 100 test specimens of the evaluation battery pack of Example A1 were prepared, followed by measuring insulation properties between the negative electrode metal terminal 14B and the packaging material 13 forming the evaluation battery pack of Example A1, using a withstand-voltage/insulation-resistance test machine. Insulation properties were measured for the 100 test specimens. In this case, evaluation was expressed with ⊙ (very good) if none of the test specimens caused short circuiting, with ○ (good), if less than 10 test specimens caused short circuiting, and with x (bad), if 10 or more test specimens caused short circuit.

Then, 100 test specimens of an evaluation battery pack were prepared for each of Examples A2 to A17 and Comparative Examples A1 and A2 and insulation properties were evaluated in a manner similar to the one used for the insulation properties evaluation test conducted for the evaluation battery packs of Example A1.

Table 4 shows evaluations on insulation properties of the evaluation battery packs of Examples A1 to A17 and Comparative Examples A1 and A2.

<Evaluation Test on Sensing Rate for Negative and Positive Electrode Tabs of Examples A1 to A17 and Comparative Examples A1 and A2>

First, 500 test specimens of the evaluation battery pack of Example A1 were prepared, followed by calculating a rate of detection of a detector's detecting the negative and positive electrode tabs (sensing rate). The detector used in this case was an image detector (CV-X100 manufactured by Keyence Corporation).

Evaluation was expressed with ⊙ (very good) if the tab detection rate was 95% or more, with ○ (good), if less than 95% but 90% or more, and with x (bad), if less than 90%.

Then, 500 test specimens of evaluation battery pack were prepared for each of Examples A2 to A17 and Comparative Examples A1 and A2, followed by evaluating the sensing rate for the negative and positive electrode tabs of these examples, in a manner similar to Example A1.

Table 4 shows evaluations on sensing rate for the negative and positive electrode tabs of Examples A1 to A17 and Comparative Examples A1 and A2.

<Summary of Evaluations of Table 4>

As can be seen from the evaluations of Examples A1 to A3 and Comparative Example A1 of Table 4, it was confirmed that, when neither of the first and second outermost layers 31 and 32 was provided with amorphous silica, anti-blocking properties of the laminate film were poor and sensing rate for the negative and positive electrode tabs was lowered.

As can be seen from the evaluation of Comparative Example A2 that uses spherical silica, it was confirmed that use of spherical silica deteriorated anti-blocking properties of the laminate film.

Accordingly, from the evaluations of Examples A1 to A3 and Comparative Examples A1 and A2, it was confirmed that amorphous silica was needed to be contained in at least one of the first and second outermost layers to improve anti-blocking properties of the laminate film and enhance sensing rate for the negative and positive electrode tabs.

From the evaluations of Examples A9 and A13, it was confirmed that, when the average particle size of amorphous silica was excessively small (in this case, 0.03 µm (value of Example A13)) relative to the thickness of the first and second insulating layers, evaluations on anti-blocking properties were downgraded from ⊙ (evaluations of Example A9 where the average particle size of amorphous silica was 1.0 µm) to ○ (evaluation of Example A13).

From this, it was confirmed that amorphous silica preferably had an average particle size of more than 0.03 µm.

From the evaluations of Examples A5 and A17, it was confirmed that, when the average particle size of amorphous silica was excessively large (in this case, 25.0 µm) relative to the thickness of the first and second insulating layers, evaluation on anti-blocking properties was very good, but evaluation on adhesiveness was degraded from ⊙ (evaluation of Example A1) to x (evaluation of Example A17).

From these results, it was confirmed that amorphous silica preferably had an average particle size of less than 25.0 µm.

From the evaluations of Examples A1 to A9, it was confirmed that, when the average particle size of the amorphous insulating filler was in the range of 1.0 to 10.0 µm, evaluations were very good in all the items of anti-blocking properties, adhesiveness, insulation properties and sensing rate (evaluations were all ⊙).

From the evaluations of Examples A6 and A9, it was confirmed that, when the thickness of the first and second insulating layers 35 and 38 containing amorphous silica was 2 to 30 times the average particle size of the amorphous silica, evaluations were very good in all the items of anti-blocking properties, adhesiveness, insulation properties and sensing rate (evaluations were all ⊙).

From the evaluations of Examples A1 to A9, A13 and A16, it was confirmed that, when the third insulating layer did not contain carbon black, evaluation on sensing rate was bad (i.e. evaluation was x), and, when the third insulating layer contained carbon black by 0.01 to 0.5 wt %, valuation on sensing rate was very good (i.e. evaluation was ⊙).

From this, it was confirmed that, when the third insulating layer contained carbon black by 0.01 wt % or more, evaluation on sensing rate was very good (i.e. evaluation was ⊙).

From the evaluations of Examples A1, A5 and A14, it was confirmed that, when the additive amount of amorphous insulating filler was 0.03 wt %, evaluation on anti-blocking properties was degraded (i.e. evaluation was ○).

From the evaluations of Examples A10 and A11, it was confirmed that phthalocyanine blue or titanium dioxide can be used instead of carbon black.

Good evaluations of ○ or ⊙ were obtained of the anti-blocking properties for Examples A1 to A17.

The following description addresses Examples B1 to B14 and Comparative Example B, corresponding to the foregoing second embodiment.

Example B1

Preparation of Positive and Negative Electrode Tabs

Referring to FIG. 7, hereinafter is described a method for fabricating positive and negative electrode tabs of Example B1 (i.e. the structure made up of the metal terminals 114 (also referred to as tab leads) and the pair of electrical storage device terminal films 116 (also referred to as tab sealants)).

First, a thin aluminum plate with a width of 5 mm, a length of 20 mm and a thickness of 100 μm was prepared as the metal terminal body 114-1 for use as a positive electrode. Then, non-chrome surface treatment was performed with respect to surfaces of the thin aluminum plate to form the anti-corrosion layer 114-2 (non-chrome surface treatment layer). Thus, there was prepared the positive-electrode side metal terminal 114 (hereinafter is referred to as positive electrode metal terminal 114A for convenience's sake) including the thin aluminum plate and the non-chrome surface treatment layer.

Then, a thin nickel plate with a width of 5 mm, a length of 20 mm and a thickness of 100 μm was prepared as the metal terminal body 114-1 for use as a negative electrode. Then, non-chrome surface treatment was performed with respect to surfaces of the thin nickel plate to form the anti-corrosion layer 114-2 (non-chrome surface treatment layer). Thus, there was prepared the negative-electrode side metal terminal 114 (hereinafter is referred to as negative electrode metal terminal 114B for convenience's sake) including the thin nickel plate and the non-chrome surface treatment layer.

Then, spherical silica (the insulating filler 136) with an average particle size of 10.0 μm was added, at a concentration (content) of 3.0 wt %, to an acid-modified polypropylene serving as a base material for the first insulating layer 135, followed by mixing, thereby preparing a base material for the first outermost layer 131.

Then, spherical silica (the insulating filler 139) with an average particle size of 10.0 μm was added, at a concentration (content) of 3.0 wt %, to an acid-modified polypropylene serving as a base material for the second insulating layer 138, followed by mixing, thereby preparing a base material for the second outermost layer 132.

Then, carbon black (the electrically conductive pigment 142) with an average particle size of 20 nm was added, at a concentration (content) of 0.1 wt %, to a polypropylene serving as a base material for the intermediate layer 133, followed by mixing, thereby preparing a base material for the intermediate layer 133.

Then, the base materials for the first outermost layer 131, the second outermost layer 132, and the intermediate layer 133 were set to an inflation-type film extrusion manufacturing apparatus (Co—OI model) manufactured by Sumitomo Heavy Industries Modern, Ltd. Using the film extrusion manufacturing apparatus, the three base materials were extruded to prepare a laminate film (film serving as a base material for the electrical storage device terminal film 116).

In this case, the laminate film was formed such that the first insulating layer 135 had a thickness of 30 μm, the second insulating layer 138 had a thickness of 30 μm, and the third insulating layer 141 had a thickness of 30 μm.

Melting temperature was set to 210° C. for the base materials for the first and second outermost layers 131 and 132 and the intermediate layer 133. Blow rate was set to 2.2.

Then, the laminate film was cut to prepare four electrical storage device terminals films 116 each having a width of 9 mm and a length of 5 mm.

After that, the positive electrode metal terminal 114A was sandwiched between two electrical storage device terminal films 116. The two electrical storage device terminal films 16 were heated at 155° C. for 10 seconds to thermally adhere the positive electrode metal terminal 114A to the two electrical storage device terminal films 116. Thus, there was prepared a positive electrode tab made up of the positive electrode metal terminal 114A and the two electrical storage device terminal films 116.

Then, in a similar manner, the negative electrode metal terminal 114B was thermally adhered to two electrical storage device terminal films 116 that sandwiched the negative electrode metal terminal 114B therebetween. Thus, there was prepared a negative electrode tab made up of the negative electrode metal terminal 114B and the two electrical storage device terminal films 116.

<Preparation of Evaluation Battery Pack>

Then, the packaging material 113 in a 50 mm×90 mm rectangular shape was prepared. The packaging material 113 had a lamination of a nylon layer with a thickness of 25 μm (the outer layer 126), a polyester polyol adhesive with a thickness of 5 μm (the outer-side adhesive layer 125), an annealed A8079 aluminum foil with a thickness of 40 μm (the barrier layer 124), a first anti-corrosion treatment layer formed by applying non-chrome surface treatment to a surface of an aluminum foil (the anti-corrosion treatment layer 123-1), a second anti-corrosion treatment layer formed by applying non-chrome surface treatment to the other surface of the aluminum foil (the anti-corrosion treatment layer 123-2), an acid-modified polypropylene layer with a thickness of 30 μm (the inner layer-side adhesive layer 122), and a polypropylene layer with a thickness of 40 μm (the inner layer 121).

Then, the packaging material 113 was folded into two at middle points of respective long sides thereof to form two folds. The packaging material 113 in two folds with a length of 45 mm was heat-sealed, with the positive and negative electrode tabs being sandwiched, on one side, between the folds to thermally adhere the packaging material 113 to the positive and negative electrode tabs. The heat sealing was performed at 190° C. for 5 seconds.

After that, 2 mL electrolytic solution obtained by adding lithium hexafluorophosphate to a mixed solution of diethyl carbonate and ethylene carbonate was filled in the packaging material 113.

Then, the remaining side of the packaging material 113 was heat-sealed. The heat sealing in this case was performed at 190° C. for 3 seconds.

In this way, there was prepared a battery pack that can be subjected to tab evaluation, with no electrical storage device body 111 being sealed therein.

Example B2

In Example B2, laminate films of Example B2 (films each serving as the base material for the electrical storage device terminal film 116) were prepared in a manner similar to the laminate films of Example B1, except that spherical silica (the insulating filler 136) was not added to the first insulating layer 135.

After that, an evaluation battery pack of Example B2 was prepared in a manner similar to that of Example B1.

Example B3

In Example B3, laminate films of Example B3 (films each serving as the base material for the electrical storage device terminal film 116) were prepared in a manner similar to the laminate films of Example B1, except that spherical silica (the insulating filler 139) was not added to the second insulating layer 138.

After that, an evaluation battery pack of Example B3 was prepared in a manner similar to that of Example B1.

Example B4

In Example B4, laminate films of Example B4 (films each serving as the base material for the electrical storage device terminal film 116) were prepared in a manner similar to the laminate films of Example B1, except that carbon black was added to the third insulating layer 141 at a concentration (content) of 1.0 wt %.

After that, an evaluation battery pack of Example B4 was prepared in a manner similar to that of Example B1.

Example B5

In Example B5, laminate films of Example B5 (films each serving as the base material for the electrical storage device terminal film 116) were prepared in a manner similar to the laminate films of Example B1, except that carbon black was added to the third insulating layer 141 at a concentration (content) of 0.01 wt %, the average particle size of spherical silica (the insulating fillers 136 and 139) added to the first and second insulating layers 135 and 138 was changed to 3.0 μm, and the content of the insulating fillers 136 and 139 was changed to 1.0 wt %.

After that, an evaluation battery pack of Example B5 was prepared in a manner similar to that of Example B1.

Example B6

In Example B6, laminate films of Example B6 (films each serving as the base material for the electrical storage device terminal film 116) were prepared in a manner similar to the laminate films of Example B1, except that the average particle size of spherical silica (the insulating fillers 136 and 139) was changed to 3.0 μm, and the content of the insulating fillers 136 and 139 was changed to 20.0 wt %.

After that, an evaluation battery pack of Example B6 was prepared in a manner similar to that of Example B1.

Example B7

In Example B7, laminate films of Example B7 (films each serving as the base material for the electrical storage device terminal film 116) were prepared in a manner similar to the laminate films of Example B1, except that amorphous alumina (the insulating fillers 136 and 139) with an average particle size of 1.0 μm was used instead of spherical silica, and the content of the insulating fillers 136 and 139 was changed to 1.0 wt %.

After that, an evaluation battery pack of Example B7 was prepared in a manner similar to that of Example B1.

Example B8

In Example B8, laminate films of Example B8 (films each serving as the base material for the electrical storage device terminal film 116) were prepared in a manner similar to the laminate films of Example B1, except that the average particle size of spherical silica (the insulating fillers 136 and 139) was 1.0 μm, and the content of the insulating fillers 136 and 139 was changed to 5.0 wt %.

After that, an evaluation battery pack of Example B8 was prepared in a manner similar to that of Example B1.

Example B9

In Example B9, laminate films of Example B9 (films each serving as the base material for the electrical storage device terminal film 116) were prepared in a manner similar to the laminate films of Example B1, except that a polypropylene layer (10 μm) was arranged between the intermediate layer 133 and the second outermost layer 132, and the thickness of the first and second insulating layers 135 and 138 was changed to 20 μm.

After that, an evaluation battery pack of Example B9 was prepared in a manner similar to that of Example B1.

Example B10

In Example B10, laminate films of Example B10 (films each serving as the base material for the electrical storage device terminal film) were prepared in a manner similar to the laminate films of Example B1, except that the concentration (content) of carbon black added to the third insulating layer 141 was 0.005 wt %.

After that, an evaluation battery pack of Example B10 was prepared in a manner similar to that of Example B1.

Example B11

In Example B11, laminate films of Example B11 (films each serving as the base material for the electrical storage device terminal film) were prepared in a manner similar to the laminate films of Example B1, except that the concentration (content) of carbon black added to the third insulating layer 141 was 10.0 wt %.

After that, an evaluation battery pack of Example B11 was prepared in a manner similar to that of Example B1.

Example B12

In Example B12, laminate films of Example B12 (films each serving as the base material for the electrical storage device terminal film) were prepared in a manner similar to the laminate films of Example B1, except that the thickness of the first and second insulating layers 135 and 138 was 15 μm.

After that, an evaluation battery pack of Example B12 was prepared in a manner similar to that of Example B1.

Example B13

In Example B13, laminate films of Example B13 (films each serving as the base material for the electrical storage device terminal film) were prepared in a manner similar to the laminate films of Example B1, except that spherical silica (the insulating filler 136) added to the first insulating layer had an average particle size of 0.5 μm, concentration (content) of the spherical silica (the insulating filler 136) was 0.05 wt %, and no spherical silica (the insulating filler 139) was added to the second insulating layer.

After that, an evaluation battery pack of Example B13 was prepared in a manner similar to that of Example B1.

Example B14

In Example B14, laminate films of Example B14 (films each serving as the base material for the electrical storage device terminal film) were prepared in a manner similar to the laminate films of Example B1, except that spherical silica (the insulating fillers 136 and 139) added to the first and second insulating layer2 had an average particle size of 10.0 μm, and concentration (content) of the spherical silica (the insulating fillers 136 and 139) was 40.0 wt %.

After that, an evaluation battery pack of Example B14 was prepared in a manner similar to that of Example B1.

Comparative Example B

In Comparative Example B, laminate films of Comparative Example B (films each serving as the base material for the electrical storage device terminal film) were prepared in a manner similar to the laminate films of Example B1, except that carbon black was not added to the third insulating layer 141.

After that, an evaluation battery pack of Comparative Example B was prepared in a manner similar to that of Example B1.

<Evaluation on Sensing Rate for Negative and Positive Electrode Tabs of Examples B1 to B14 and Comparative Example B>

First, 500 test specimens of the evaluation battery pack of Example B1 were prepared, followed by calculating a detection rate of a detector's detecting the negative and positive electrode tabs (sensing rate). The detector used in this case was an image detector (CV-X100 manufactured by Keyence Corporation).

Evaluation was expressed with ⊙ (very good) if the tab detection rate was 95% or more, with ○ (good), if less than 95% but 90% or more, and with x (bad), if less than 90%.

Then, 500 test specimens of evaluation battery pack were prepared for each of Examples B2 to A14 and Comparative Example B, followed by evaluating the sensing rate for the negative and positive electrode tabs of these examples, in a manner similar to Example B1.

Table 8 shows evaluations on sensing rate for the negative and positive electrode tabs of Examples B1 to B14 and Comparative Example B. Tables 5 to 7 show thickness, type and average particle size of insulating filler, concentration (content) of carbon black, and the like of Examples B1 to B14 and Comparative Example B.

TABLE 5

| | Insulating filler present in first outermost layer? | Type of insulating filler in first outermost layer | Average particle size of insulating filler in first outermost layer (μm) | Concentration of insulating filler in first outermost layer (wt %) | Thickness of first insulating layer (μm) |
|---|---|---|---|---|---|
| Ex. B1 | Yes | Spherical silica | 10.0 | 3.0 | 30 |
| Ex. B2 | No | — | — | 0.0 | 30 |
| Ex. B3 | Yes | Spherical silica | 10.0 | 3.0 | 30 |
| Ex. B4 | Yes | Spherical silica | 10.0 | 3.0 | 30 |
| Ex. B5 | Yes | Spherical silica | 3.0 | 1.0 | 30 |
| Ex. B6 | Yes | Spherical silica | 3.0 | 20.0 | 30 |
| Ex. B7 | Yes | Amorphous silica | 1.0 | 1.0 | 30 |
| Ex. B8 | Yes | Spherical silica | 1.0 | 5.0 | 30 |
| Ex. B9 | Yes | Spherical silica | 10.0 | 3.0 | 20 |
| Ex. B10 | Yes | Spherical silica | 10.0 | 3.0 | 30 |
| Ex. B11 | Yes | Spherical silica | 10.0 | 3.0 | 30 |
| Ex. B12 | Yes | Spherical silica | 10.0 | 3.0 | 15 |
| Ex. B13 | Yes | Spherical silica | 0.5 | 0.05 | 30 |
| Ex. B14 | Yes | Spherical silica | 10.0 | 40.0 | 30 |
| Comp. Ex. B | Yes | Spherical silica | 10.0 | 3.0 | 30 |

TABLE 6

|  | Insulating filler present in second outermost layer? | Type of insulating filler in second outermost layer | Average particle size of insulating filler in second outermost layer (μm) | Concentration of insulating filler in second outermost layer (wt %) | Thickness of second insulating layer (μm) |
|---|---|---|---|---|---|
| Ex. B1 | Yes | Spherical silica | 10.0 | 3.0 | 30 |
| Ex. B2 | Yes | Spherical silica | 10.0 | 3.0 | 30 |
| Ex. B3 | No | — | — | 0.0 | 30 |
| Ex. B4 | Yes | Spherical silica | 10.0 | 3.0 | 30 |
| Ex. B5 | Yes | Spherical silica | 3.0 | 1.0 | 30 |
| Ex. B6 | Yes | Spherical silica | 3.0 | 20.0 | 30 |
| Ex. B7 | Yes | Amorphous silica | 1.0 | 1.0 | 30 |
| Ex. B8 | Yes | Spherical silica | 1.0 | 5.0 | 30 |
| Ex. B9 | Yes | Spherical silica | 10.0 | 3.0 | 20 |
| Ex. B10 | Yes | Spherical silica | 10.0 | 3.0 | 30 |
| Ex. B11 | Yes | Spherical silica | 10.0 | 3.0 | 30 |
| Ex. B12 | Yes | Spherical silica | 10.0 | 3.0 | 15 |
| Ex. B13 | No | Spherical silica | — | — | 30 |
| Ex. B14 | Yes | Spherical silica | 10.0 | 40.0 | 30 |
| Comp. Ex. B | Yes | Spherical silica | 10.0 | 3.0 | 30 |

TABLE 7

|  | Thickness of third insulating layer (μm) | Content of carbon black in intermediate layer (wt %) | Polypropylene layer (10 μm) present between intermediate layer and second outermost layer? |
|---|---|---|---|
| Ex. B1 | 30 | 0.1 | No |
| Ex. B2 | 30 | 0.1 | No |
| Ex. B3 | 30 | 0.1 | No |
| Ex. B4 | 30 | 1.0 | No |
| Ex. B5 | 30 | 0.01 | No |
| Ex. B6 | 30 | 0.1 | No |
| Ex. B7 | 30 | 0.1 | No |
| Ex. B8 | 30 | 0.1 | No |
| Ex. B9 | 30 | 0.1 | Yes |
| Ex. B10 | 30 | 0.005 | No |
| Ex. B11 | 30 | 10.0 | No |
| Ex. B12 | 30 | 0.1 | No |
| Ex. B13 | 30 | 0.1 | No |
| Ex. B14 | 30 | 0.1 | No |
| Comp. Ex. B | 30 | 0.0 | No |

TABLE 8

|  | Evaluation on sensing rate | Evaluation on insulation properties | Evaluation on adhesiveness |
|---|---|---|---|
| Ex. B1 | ⊙ | ⊙ | ⊙ |
| Ex. B2 | ⊙ | ⊙ | ⊙ |
| Ex. B3 | ⊙ | ⊙ | ⊙ |
| Ex. B4 | ⊙ | ⊙ | ⊙ |
| Ex. B5 | ⊙ | ⊙ | ⊙ |
| Ex. B6 | ⊙ | ⊙ | ⊙ |
| Ex. B7 | ⊙ | ○ | ⊙ |
| Ex. B8 | ⊙ | ⊙ | ⊙ |
| Ex. B9 | ⊙ | ⊙ | ⊙ |
| Ex. B10 | ○ | ⊙ | ⊙ |
| Ex. B11 | ⊙ | ○ | ⊙ |
| Ex. B12 | ⊙ | ○ | ○ |
| Ex. B13 | ⊙ | ○ | ⊙ |
| Ex. B14 | ⊙ | ⊙ | ○ |
| Comp. Ex. B | X | ⊙ | ⊙ |

<Evaluation on Insulation Properties for Evaluation Battery Packs of Examples B1 to B14 and Comparative Example B>

First, 100 test specimens of the evaluation battery pack of Example B1 were prepared, followed by measuring insulation properties between the negative electrode metal terminal 114B and the packaging material 113 forming the evaluation battery pack of Example B1, using a withstand-voltage/insulation-resistance test machine.

Insulation properties were measured for the 100 test specimens. In this case, evaluation was expressed with ⊙ (very good) if none of the test specimens caused short circuiting, with ○ (good), if less than 10 test specimens caused short circuiting, and with x (bad), if 10 or more test specimens caused short circuit.

Then, 100 test specimens of the evaluation battery pack were prepared for each of Examples B2 to B14 and Comparative Example B and insulation properties were evaluated in a manner similar to the one used for the insulation properties evaluation test conducted for the evaluation battery packs of Example B1.

Table 8 shows evaluations on insulation properties of the evaluation battery packs of Examples B1 to B14 and Comparative Example B.

<Evaluation on Adhesiveness for Evaluation Battery Packs of Examples B1 to B14 and Comparative Example B>

For each of Examples B1 to B14 and Comparative Example B, 100 test specimens of the evaluation battery pack were prepared. The 100 evaluation battery packs of each of Examples B1 to B14 and Comparative Example B were stored for 4 weeks in a room where the temperature was maintained at 80° C. to confirm leakage of the sealed-in electrolytic solution.

Evaluation was expressed with ⊙ (very good) if none of the test specimens caused leakage, with ○ (good), if less than 5 test specimens caused leakage, and with x (bad), if 5 or more test specimens caused leakage.

Table 8 shows evaluations on adhesiveness for the evaluation battery packs of Examples B1 to B14 and Comparative Example B.

<Summary of Evaluations of Table 8>

As can be seen from Table 8, Examples B1 to B14 obtained good evaluations (evaluation ⊙ or ○) on sensing rate, insulation properties and adhesiveness. Examples B1 to B6, B8 and B9 obtained very good evaluations (evaluation ⊙) on all of sensing rate, insulation properties and adhesiveness.

From the evaluations of Examples B1 to B14, it was confirmed that both of spherical and amorphous insulating fillers were usable.

From the evaluations of Examples B1 to B3, it was confirmed that, when at least one of the first and second outermost layers 131 and 132 contained spherical silica, good results were obtained of sensing rate, insulation properties and adhesiveness.

From the evaluations of Examples B1 to B9, it was confirmed that, when the average particle size of the insulating fillers 136 and 139 was in the range of 1/30 to 1/2 the thickness of the first and second insulating layers 135 and 138, respectively, to which the fillers were added, good evaluations were obtained of sensing rate, insulation properties and adhesiveness.

From the evaluations of Examples B1 to B9, it was confirmed that, when the content of the insulating fillers 136 and 139 was in the range of 1.0 to 20 wt %, good evaluations were obtained in sensing rate, insulation properties and adhesiveness.

From the evaluations of Examples B1 to B12 and Comparative Example B, it was confirmed that, when the content of carbon black in the intermediate layer 133 was less than 0.01 wt % (specifically, when the content of carbon black was 0.005 wt %), sensing rate was lowered (specifically, evaluation of sensing rate was ○), and when the content of carbon black in the intermediate layer 133 was 0.1 wt % or more, sensing rate was improved.

From the evaluation of Example B14, it was confirmed that, when the particle size of spherical silica was large (in this case, 10.0 μm) and the concentration of the insulating fillers contained in the first and second insulating layers was high (in this case, 40 wt %), adhesiveness was lowered.

INDUSTRIAL APPLICABILITY

The present invention can be applied to an electrical storage device terminal film which is interposed between a packaging material packaging an electrical storage device body and a metal terminal electrically connected to the electrical storage device body and extending outside the packaging material, and can be applied to electrical storage devices including the electrical storage device terminal film.

REFERENCE SIGNS LIST 10, 110 . . . Electrical storage device;
11, 111 . . . Electrical storage device body;
13, 113 . . . Packaging material;
14, 114 . . . Metal terminal;
14-1, 114-1 . . . Metal terminal body;
14-2, 114-2 . . . Anti-corrosion layer;
16, 116 . . . Electrical storage device terminal film;
21, 121 . . . Inner layer;
22, 122 . . . Inner layer-side adhesive layer;
23-1, 23-2, 123-1, 123-2 . . . Anti-corrosion treatment layer;
24, 124 . . . Barrier layers;
25, 125 . . . Outer layer-side adhesive layer;
26, 126 . . . Outer layer;
31, 131 . . . First outermost layer;
32, 132 . . . Second outermost layer;
33, 133 . . . Intermediate layer;
5, 135 . . . First insulating layer;
35a, 38a . . . Outer surface;
36, 39 . . . Amorphous insulating filler;
136, 139 . . . Insulating filler;
38, 138 . . . Second insulating layer;
41, 141 . . . Third insulating layer;
42 . . . Pigment;
142 . . . Electrically conductive pigment.

What is claimed is:

1. An electrical storage device terminal film arranged covering at least part of an outer peripheral surface of a metal terminal electrically connected to an electrical storage device body configuring an electrical storage device, comprising:
   a first outermost layer including a first insulating layer;
   a second outermost layer including a second insulating layer; and
   an amorphous insulating filler added to at least one of the first insulating layer and the second insulating layer, wherein:
   part of the amorphous insulating filler is arranged being protruded from an outer surface of the insulating layer to which the amorphous insulating filler has been added.

2. The electrical storage device terminal film of claim 1, wherein the amorphous insulating filler has an average particle size in a range of 0.1 to 20 μm.

3. The electrical storage device terminal film of claim 1, wherein the insulating layer to which the amorphous insulating filler has been added has a thickness 2 to 30 times the average particle size of the amorphous insulating filler.

4. The electrical storage device terminal film of claim 1, wherein an additive amount of the amorphous insulating filler is in a range of 0.1 to 20 wt %.

5. The electrical storage device terminal film of claim 1, wherein the amorphous insulating filler is added to only one of the first insulating layer and the second insulating layer.

6. The electrical storage device terminal film of claim 1, comprising a third insulating layer arranged between the first outermost layer and the second outermost layer, and an intermediate layer containing a pigment added to the third insulating layer.

7. The electrical storage device terminal film of claim 6, wherein fourth insulating layers are arranged between the intermediate layer and the first outermost layer and between the intermediate layer and the second outermost layer.

8. An electrical storage device comprising:
   an electrical storage device terminal film of claim 1;
   an electrical storage device body performing charging/discharging;
   a pair of the metal terminals each electrically connected to the electrical storage device body and partially covered with the electrical storage device terminal film; and
   a packaging material covering part of the electrical storage device terminal film, and the electrical storage device body.

9. The electrical storage device of claim 8, wherein:
   the first outermost layer is arranged covering part of an outer peripheral surface of the metal terminal; and
   the second outermost layer is arranged being in contact with the packaging material.

10. An electrical storage device terminal film arranged covering at least part of an outer peripheral surface of a metal terminal electrically connected to an electrical storage device body configuring an electrical storage device, comprising:
    a first outermost layer including a first insulating layer;
    a second outermost layer including a second insulating layer;
    a third insulating layer arranged between the first outermost layer and the second outermost layer, and an intermediate layer containing an electrically conductive pigment enabling a coloration in black, the pigment being added to the third insulating layer, wherein:
    an insulating filler is added to at least one of the first insulating layer and the second insulating layer.

11. The electrical storage device terminal film of claim 10, wherein an insulating filler is added to only one of the first insulating layer and the second insulating layer.

12. The electrical storage device terminal film of claim 10, wherein a content of the electrically conductive pigment in the intermediate layer is in a range of 0.01 wt % to 3.00 wt %, inclusive.

13. The electrical storage device terminal film of claim 10, wherein the insulating filler has an average particle size that is $\frac{1}{30}$ to $\frac{1}{2}$ the thickness of an insulating layer to which the insulating filler has been added.

14. The electrical storage device terminal film of claim 10, wherein a content of the insulating filler is in a range of 0.1 wt % to 20 wt %, inclusive.

15. The electrical storage device terminal film of claim 10, wherein the insulating filler has a spherical shape.

16. The electrical storage device terminal film of claim 10, wherein fourth insulating layers are arranged between the intermediate layer and the first outermost layer and between the intermediate layer and the second outermost layer.

17. An electrical storage device comprising:
    an electrical storage device terminal film of claim 10;
    an electrical storage device body performing charging/discharging;
    a pair of the metal terminals each electrically connected to the electrical storage device body and partially covered with the electrical storage device terminal film; and
    a packaging material covering part of the electrical storage device terminal film, and the electrical storage device body.

18. The electrical storage device of claim 17, wherein:
    the first outermost layer is arranged covering part of an outer peripheral surface of the metal terminal, and the second outermost layer is arranged being in contact with the packaging material; and
    the first outermost layer contains the insulating filler.

* * * * *